United States Patent
Xiahou et al.

(10) Patent No.: US 12,483,435 B2
(45) Date of Patent: Nov. 25, 2025

(54) INTERACTION METHOD AND APPARATUS, AND ELECTRONIC DEVICE

(71) Applicant: BEIJING BYTEDANCE NETWORK TECHNOLOGY CO., LTD., Beijing (CN)

(72) Inventors: Jiaxi Xiahou, Shanghai (CN); Mao Li, Shanghai (CN); Xin Zhang, Shanghai (CN); Jingsheng Yang, Shanghai (CN); Shun Huang, Hangzhou (CN); Ziyun Qi, Shanghai (CN); Zhenli Dai, Shanghai (CN); Zhou Yu, Hangzhou (CN); Lingfeng Li, Shanghai (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 133 days.

(21) Appl. No.: 17/877,932

(22) Filed: Jul. 30, 2022

(65) Prior Publication Data
US 2022/0368552 A1    Nov. 17, 2022

Related U.S. Application Data

(63) Continuation of application No. PCT/CN2021/077494, filed on Feb. 23, 2021.

(30) Foreign Application Priority Data

Feb. 24, 2020   (CN) .......................... 202010114035.3
Feb. 24, 2020   (CN) .......................... 202010114478.2

(51) Int. Cl.
*H04L 12/18*   (2006.01)

(52) U.S. Cl.
CPC ...... *H04L 12/1822* (2013.01); *H04L 12/1818* (2013.01)

(58) Field of Classification Search
CPC ............. H04L 12/1822; H04L 12/1818; H04L 65/611; H04L 65/765; H04L 65/403; H04N 7/15
See application file for complete search history.

(56) References Cited

U.S. PATENT DOCUMENTS 9,001,178 B1    4/2015  Leske et al.
9,137,376 B1 *  9/2015  Basart ..................... H04M 3/56
(Continued)

FOREIGN PATENT DOCUMENTS

CN    101102458 A    1/2008
CN    101848221 A    9/2010
(Continued)

OTHER PUBLICATIONS

First Office Action issued Aug. 8, 2022 in Chinese Application No. 202010114035.3 (19 pages), with English translation (23 pages).
(Continued)

*Primary Examiner* — Syed Ali

(57) ABSTRACT

Disclosed in the embodiments of the present disclosure are an interaction method and apparatus, and an electronic device. A specific implementation of the method comprises: in response to detecting a trigger operation for a multimedia conference control, sending a multimedia conference start request to a server, wherein the server starts a multimedia conference in response to determining to start the multimedia conference on the basis of the multimedia conference start request; and in response to detecting a confirmation operation for a live broadcast conference confirmation control, sending live broadcast conference confirmation information to the server, wherein a live stream is generated on the basis of a received multimedia conference stream in response to the server receiving the live broadcast conference confirmation information, and in response to receiving the multimedia conference stream, and the multimedia con-
(Continued)

ference stream is sent to the server by a participating subject of the multimedia conference. Thus, provided is a method for generating a live stream on the basis of the multimedia conference stream.

25 Claims, 6 Drawing Sheets

(56) References Cited

U.S. PATENT DOCUMENTS

| | | | |
|---|---|---|---|
| 9,148,516 B1* | 9/2015 | Moore | H04M 3/567 |
| 9,402,056 B2* | 7/2016 | Meek | H04N 7/152 |
| 10,114,689 B1 | 10/2018 | Yang et al. | |
| 10,523,898 B1* | 12/2019 | Ward | H04N 7/152 |
| 10,681,310 B2* | 6/2020 | Garrido | H04M 1/72439 |
| 2006/0023062 A1 | 2/2006 | Elbaze et al. | |
| 2006/0200518 A1* | 9/2006 | Sinclair | H04N 7/142 348/E7.083 |
| 2009/0006410 A1 | 1/2009 | Choi | |
| 2009/0041226 A1 | 2/2009 | Jabbour et al. | |
| 2010/0225736 A1* | 9/2010 | King | H04N 7/152 348/14.09 |
| 2011/0043600 A1 | 2/2011 | Gopal et al. | |
| 2011/0217021 A1* | 9/2011 | Dubin | H04N 7/15 386/278 |
| 2011/0252156 A1 | 10/2011 | Basso et al. | |
| 2012/0144445 A1 | 6/2012 | Bonta et al. | |
| 2012/0198335 A1 | 8/2012 | Huang | |
| 2012/0244836 A1* | 9/2012 | Colbert | H04L 12/1822 455/411 |
| 2012/0262533 A1* | 10/2012 | Gannu | H04M 3/567 704/E15.005 |
| 2012/0311647 A1 | 12/2012 | Sharma et al. | |
| 2013/0147900 A1* | 6/2013 | Weiser | H04N 7/152 348/E7.083 |
| 2013/0147902 A1* | 6/2013 | Weiser | H04L 65/1104 348/E7.083 |
| 2014/0198173 A1 | 7/2014 | Willig et al. | |
| 2015/0012270 A1* | 1/2015 | Reynolds | G10L 25/84 704/233 |
| 2015/0103131 A1* | 4/2015 | Denoue | H04N 7/15 348/14.03 |
| 2015/0244754 A1 | 8/2015 | Beckham, Jr. | |
| 2015/0304605 A1* | 10/2015 | Hartman | H04N 7/15 725/109 |
| 2015/0334202 A1 | 11/2015 | Frydman et al. | |
| 2016/0037200 A1 | 2/2016 | Gordon | |
| 2016/0080432 A1* | 3/2016 | Seferian | H04L 12/1818 348/14.08 |
| 2016/0285928 A1* | 9/2016 | Sanso | H04L 65/70 |
| 2016/0294887 A1* | 10/2016 | George | H04L 65/61 |
| 2016/0294889 A1* | 10/2016 | George | H04L 65/403 |
| 2017/0013040 A1 | 1/2017 | Ponekker et al. | |
| 2017/0048293 A1 | 2/2017 | Huang et al. | |
| 2017/0076156 A1* | 3/2017 | Borel | G11B 27/031 |
| 2017/0078707 A1 | 3/2017 | Barber | |
| 2017/0131850 A1* | 5/2017 | Aggarwal | H04L 65/1083 |
| 2017/0171585 A1 | 6/2017 | Chen | |
| 2017/0374118 A1* | 12/2017 | Pevzner | H04L 65/75 |
| 2019/0281343 A1* | 9/2019 | Hussain | A63F 13/352 |
| 2019/0342522 A1* | 11/2019 | Garrido | G06F 3/04845 |
| 2020/0014742 A1 | 1/2020 | Pollet | |
| 2020/0112450 A1* | 4/2020 | Chhabra | H04L 65/403 |
| 2020/0228357 A1* | 7/2020 | Stuntebeck | H04L 12/1831 |
| 2021/0152616 A1* | 5/2021 | Huang | H04L 65/403 |
| 2021/0227005 A1 | 7/2021 | Huang | |

FOREIGN PATENT DOCUMENTS

| | | |
|---|---|---|
| CN | 102281460 A | 12/2011 |
| CN | 104038725 A | 9/2014 |
| CN | 104754284 A | 7/2015 |
| CN | 105763831 A | 7/2016 |
| CN | 106330912 A | 1/2017 |
| CN | 106485966 A | 3/2017 |
| CN | 106604054 A | 4/2017 |
| CN | 108040061 A | 5/2018 |
| CN | 108055496 A | 5/2018 |
| CN | 108289187 A | 7/2018 |
| CN | 109802932 A | 5/2019 |
| CN | 109819195 A | 5/2019 |
| CN | 110099242 A | 8/2019 |
| CN | 112291502 A | 1/2021 |
| CN | 112291503 A | 1/2021 |
| JP | 2005051703 A | 2/2005 |
| JP | 2005223430 A | 8/2005 |
| JP | 2006185188 A | 7/2006 |
| JP | 2015141667 A | 8/2015 |
| JP | 2017035298 A | 2/2017 |
| WO | 2015166573 A1 | 11/2015 |
| WO | 2016184118 A1 | 11/2016 |
| WO | 2018000092 A1 | 1/2018 |
| WO | 2018095174 A1 | 5/2018 |

OTHER PUBLICATIONS

Notice of Reasons for Refusal issued Mar. 7, 2023 in Japanese Application No. 2022-550716 (3 pages), with English translation (3 pages).
International Search Report issued May 13, 2021 in International Application No. PCT/CN2021/077494.
Office Action mailed Jun. 2, 2023 in U.S. Appl. No. 17/891,194.
Extended European Search Report and Search Opinion issued Jun. 1, 2023 in European Application No. 21760805.8.
Notice of Grant issued Apr. 28, 2023 in Chinese Application No. 202010114035.3, with English translation (14 pages).
Notice of Allowance for U.S. Appl. No. 17/891,194, mailed Nov. 21, 2024, 25 pages.
Non-Final Office Action for U.S. Appl. No. 17/877,932, mailed Jun. 21, 2023, 31 Pages.
Written Opinion for International Application No. PCT/CN2021/077494, mailed May 13, 2021, 11 Pages.

\* cited by examiner

INTERACTION METHOD AND APPARATUS, AND ELECTRONIC DEVICE

CROSS REFERENCE OF RELATED APPLICATION

This application is a continuation application of International Patent Application No. PCT/CN2021/077494, titled "INTERACTION METHOD AND APPARATUS, AND ELECTRONIC DEVICE", Feb. 23, 2021, which claims the priority to Chinese Patent Application No. 202010114478.2, titled "INTERACTION METHOD AND APPARATUS, AND ELECTRONIC DEVICE", filed on Feb. 24, 2020, and Chinese Patent Application No. 202010114035.3, titled "INFORMATION INTERACTION METHOD, APPARATUS AND SYSTEM, AND ELECTRONIC DEVICE", filed on Feb. 24, 2020 with the Chinese Patent Office, both of which are incorporated herein by reference in their entireties.

TECHNICAL FIELD

Embodiments of the present disclosure relate to the technical field of Internet, and in particular to an interaction method and apparatus, and an electronic device.

BACKGROUND

With the development of the Internet, functions of terminal devices are increasingly used by users, facilitating work and life. For example, a user may start a multimedia conference with another user online through a terminal device. With the multimedia conference online, users can interact with each other at a long distance, and participate in the conference without having to gather in one place. The multimedia conference largely avoids the location and venue limitations of the traditional face-to-face conference.

With the network multimedia conference, information in the form of moving images, voice and application data (electronic whiteboard, graphics) can be transmitted in real time between two points and among multiple points, which is applicable for remote conferences, network discussions and the like. Users at two or more locations respectively can interact with each other through the networked multimedia conference.

In the network multimedia conference, a multimedia conference server generally receives a multimedia data stream sent by participating users, and interactively transmits the multimedia data stream sent by the participating users.

SUMMARY

This summary is provided to introduce concepts in a simplified form that are described in detail in the detailed description that follows. This summary is neither intended to identify key features or essential features of the claimed technical solutions, nor intended to limit the scope of the claimed technical solutions.

An interaction method and apparatus, and an electronic device are provided according to embodiments of the present disclosure. A permission control method and apparatus, and an electronic device are further provided according to embodiments of the present disclosure.

In a first aspect, an interaction method is provided according to an embodiment of the present disclosure. The method includes: sending a multimedia conference starting request to a server in response to detection of a triggering operation on a multimedia conference control, where the server starts a multimedia conference in response to determination of starting the multimedia conference based on the multimedia conference starting request; and sending conference live confirmation information to the server in response to detection of a confirmation operation on a conference live confirmation control, where in response to receipt of the conference live confirmation information by the server and in response to receipt of a multimedia conference stream, the server generates a live stream based on the received multimedia conference stream, and where the multimedia conference stream is sent to the server by a participant of the multimedia conference.

In a second aspect, a permission control method is provided according to an embodiment of the present disclosure. The permission control method includes: receiving a live stream acquisition request; and determining whether to return a live stream based on the live stream acquisition request.

In a third aspect, an interaction apparatus is provided according to an embodiment of the present disclosure. The interaction apparatus includes a first sending unit and a second sending unit. The first sending unit is configured to send a multimedia conference starting request to a server in response to detection of a triggering operation on a multimedia conference control. The server starts a multimedia conference in response to determination of starting the multimedia conference based on the multimedia conference starting request. The second sending unit is configured to send conference live confirmation information to the server in response to detection of a confirmation operation on a conference live confirmation control. In response to receipt of the conference live confirmation information by the server and in response to receipt of a multimedia conference stream, a live stream is generated based on the received multimedia conference stream. The multimedia conference stream is sent to the server by a participant of the multimedia conference.

In a fourth aspect, a permission control apparatus is provided according to an embodiment of the present disclosure. The permission control device includes: a receiving module configured to receive a live stream acquisition request; and a determining module configured to determine whether to return a live stream based on the live stream acquisition request.

In a sixth aspect, an information interaction method is provided according to some embodiments of the present disclosure, and is applied to a multimedia conference server. The information interaction method includes: receiving a multimedia data stream sent by a user participating in a multimedia conference; determining a live multimedia data stream from the multimedia data stream based on a received live instruction of the multimedia conference; and transmitting the live multimedia data stream to a live server, so that the live server generates a live data stream of the multimedia conference based on the live multimedia data stream.

In a seventh aspect, an information interaction method is provided according to some embodiments of the present disclosure, and is applied to a live server for broadcasting a multimedia conference live. The information interaction method includes: in response to receipt of a live request for broadcasting the multimedia conference live, generating a live data stream based on the live multimedia data stream sent by a multimedia conference server; sending the live data stream to a sharing user based on a received sharing request from the sharing user. The live multimedia data stream is determined by the multimedia conference server based on a received live instruction of the multimedia conference from a received multimedia data stream sent by a user participating in the multimedia conference.

In an eighth aspect, an information interaction method is provided according to some embodiments of the present disclosure, and is applied to a first terminal device of a user participating in a multimedia conference. The information interaction method includes: receiving information of the multimedia conference sent by a multimedia conference server, and determining whether the information of the multimedia conference includes information of a sharing user, where the information of the multimedia conference includes an interactive data stream of the multimedia conference, and the information of the sharing user is sent by a live server and is information of a user sharing the live data stream corresponding to the multimedia conference; playing the interactive data stream of the multimedia conference; and displaying the information of the sharing user in response to determination that the information of the multimedia conference includes the information of the sharing user. The live data stream is generated by the live server based on the live multimedia data stream sent by the multimedia conference server. The live multimedia data stream is determined by the multimedia conference server based on a received live instruction of the multimedia conference from a received multimedia data stream sent by a user participating in the multimedia conference.

In a ninth aspect, an information interaction apparatus is provided according to some embodiments of the present disclosure, and is applied to a multimedia conference server. The information interaction apparatus includes: a first receiving unit, a determining unit and a transmitting unit. The first receiving unit is configured to receive a multimedia data stream sent by a user participating in a multimedia conference. The determining unit is configured to determine a live multimedia data stream from the multimedia data stream based on a received live instruction of the multimedia conference. The transmitting unit is configured to transmit the live multimedia data stream to a live server, so that the live server generates a live data stream of the multimedia conference based on the live multimedia data stream.

In a tenth aspect, an information interaction apparatus is provided according to some embodiments of the present disclosure, and is applied to a first terminal device of a user participating in a multimedia conference. The information interaction device includes a second receiving unit, a playing unit and a displaying unit. The second receiving unit is configured to receive information of the multimedia conference sent by a multimedia conference server, and determine whether the information of the multimedia conference includes information of a sharing user. The information of the multimedia conference includes an interactive data stream of the multimedia conference. The information of the sharing user is sent by a live server and is information of a user sharing the live data stream corresponding to the multimedia conference. The playing unit is configured to play the interactive data stream of the multimedia conference. The displaying unit is configured to display the information of the sharing user in response to determination that the information of the multimedia conference includes the information of the sharing user. The live data stream is generated by the live server based on the live multimedia data stream sent by the multimedia conference server. The live multimedia data stream is determined by the multimedia conference server based on a received live instruction of the multimedia conference from a received multimedia data stream sent by a user participating in the multimedia conference.

In an eleventh aspect, an information interaction system is provided according to some embodiments of the present disclosure. The information interaction system includes a multimedia conference server, a live server, a first terminal device of a user participating in a multimedia conference, and a second terminal device of a sharing user of a live data stream. The multimedia conference server is configured to: receive a multimedia data stream sent by the user participating in the multimedia conference; determine a live multimedia data stream from the multimedia data stream according to a received live instruction of the multimedia conference; transmit the live multimedia data stream to the live server, so that the live server generates a live data stream of the multimedia conference based on the live multimedia data stream; and receive information of the sharing user sent by the live server, and send the information of the sharing user to a first terminal device of each user participating in the multimedia conference. The first terminal device of the user participating in the multimedia conference is configured to: receive multimedia information sent by the multimedia conference server, play the interactive data stream of the multimedia conference included in the multimedia information, and display information of the sharing user who shares the live data stream, and the information of the sharing user is included in the multimedia information. The live server is configured to: in response to receipt of a live request for broadcasting the multimedia conference live, generate a live data stream based on the live multimedia data stream sent by the multimedia conference server; and send the live data stream to the sharing user based on a received sharing request from the sharing user. The second terminal device is configured to: receive the live data stream sent by the live server based on the sharing request of the sharing user, and play the live data stream; and receive user feedback information inputted by the sharing user.

In a twelfth aspect, an electronic device is provided according to some embodiments of the present disclosure. The electronic device includes one or more processors and a storage device. The storage device stores one or more programs, and when the one or more programs are executed by the one or more processors, the one or more processors implement the method in the first aspect, or the method in the second aspect, or the method in the sixth aspect, or the method in the seventh aspect, or the method in the eighth aspect.

In a thirteenth aspect, a computer-readable medium is provided according to some embodiments of the present disclosure. The computer-readable medium stores a computer program which, when being executed by a processor, implements the method in the first aspect, or the method in the second aspect, or the method in the sixth aspect, or the method in the seventh aspect, or the method in the eighth aspect.

In the interaction method according to embodiments of the present disclosure, the multimedia conference starting control and the conference live confirmation control are provided, after the user starts a conference and determines to broadcast the conference live, the server generates a live stream based on the multimedia conference stream, so that more users receive the multimedia conference stream while ensuring the smoothness of the multimedia conference.

It should be noted that, for an online multimedia conference, the communication pressure of the conference increases with an increase in the number of participants.

Therefore, in order to ensure the smoothness of the multimedia conference, the number of participants are limited under certain communication resources, resulting in failure to proceed smoothly a multimedia conference for a large group. According to the solutions of the present disclosure, the multimedia conference stream is converted into a live stream, avoiding the restriction on the number of users receiving the multimedia conference while reducing the communication pressure of the multimedia conference and ensuring the smoothness of the multimedia conference.

With the information interaction method, apparatus and system as well as the electronic device according to embodiments of the present disclosure, the live multimedia data stream is determined based on the multimedia data stream sent by the user participating in the multimedia conference, and the live multimedia data stream is sent to the live server for the live server to live broadcast the live data stream of the multimedia conference, so that a user other than the user participating in the multimedia conference can acquire the content of the multimedia conference by viewing the live data stream of the multimedia conference. In a case of limited multimedia conference server and multi-user-oriented multimedia conference, some users participate in the conference via the multimedia conference server, and other users acquire the content of the multimedia conference in real time via the live server as described above, thereby reducing the load of the multimedia conference server and ensuring the smoothness of the multimedia conference.

BRIEF DESCRIPTION OF THE DRAWINGS

The above and other features, advantages and aspects of embodiments of the present disclosure will become apparent in conjunction with the accompanying drawings and with reference to the following detailed description. Throughout the drawings, the same or similar reference numbers refer to the same or similar elements. It should be understood that the drawings are schematic and that the originals and elements are unnecessarily drawn to scale.

DETAILED DESCRIPTION

Embodiments of the present disclosure are described in more detail below with reference to the accompanying drawings. Although the drawings illustrate some embodiments of the present disclosure, it should be understood that the present disclosure may be embodied in various forms and should not be construed as limited to the embodiments set forth herein. Instead, these embodiments are provided for a thorough and complete understanding of the present disclosure. It should be understood that the drawings and embodiments of the present disclosure are only for illustrative purposes, and are not intended to limit the protection scope of the present disclosure.

It should be understood that the steps described in the method embodiments of the present disclosure may be performed in a different order and/or in parallel. Furthermore, the method embodiments may include additional steps and/or an illustrated step may not be performed. The scope of the present disclosure is not limited in this regard.

The term "including" and variations thereof used herein are open-ended inclusions, that is, "including but not limited to". The term "based on" indicates "based at least in part on". The term "one embodiment" indicates "at least one embodiment," the term "another embodiment" indicates "at least one additional embodiment," and the term "some embodiments" indicates "at least some embodiments." Relevant definitions of other terms are to given in the description below.

It should be noted that the concepts such as "first" and "second" mentioned in the present disclosure are only to distinguish devices, modules or units, rather than limit an order or interdependence of functions performed by these devices, modules or units.

It should be noted that the determiners such as "a" and "a plurality of" mentioned in the present disclosure are illustrative rather than restrictive. It should be understood by those skilled in the art that unless the context clearly dictates otherwise, "a" and "a plurality of" should be construed as "one or more".

Names of messages or information exchanged between multiple devices in the embodiments of the present disclosure are only for illustrative purposes rather than intended to limit the scope of these messages or information.

Figure 1:
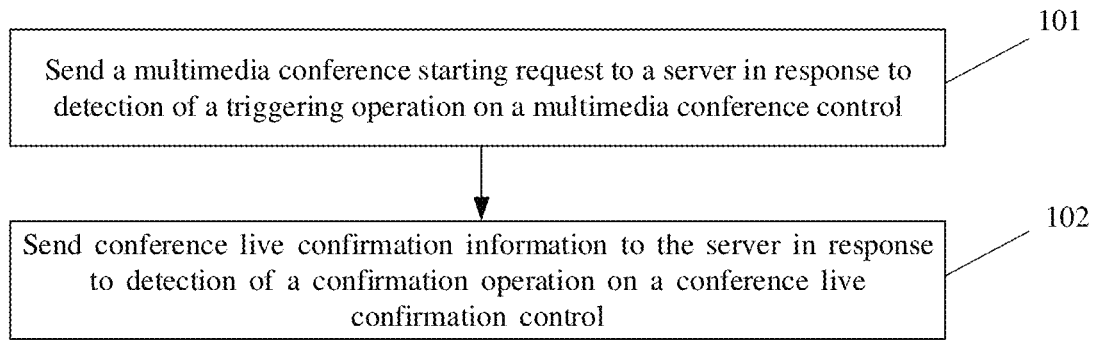
FIG. 1 is a flowchart of an interaction method according to an embodiment of the present disclosure.

Reference is made to FIG. 1, which shows a flowchart of an interaction method according to an embodiment of the present disclosure. The interaction method is applied to a terminal device. As shown in FIG. 1, the interaction method includes the following steps 101 to 102.

In step 101, a multimedia conference starting request is sent to a server in response to detection of a triggering operation on a multimedia conference control.

In this embodiment, an object (for example, a terminal device) for performing the interaction method may send a multimedia conference starting request to the server in response to detection of the triggering operation on the multimedia conference control.

In this embodiment, the multimedia conference control is configured to trigger starting of a multimedia conference.

Here, the multimedia conference may be an online conference conducted in a multimedia manner. The multimedia may include, but is not limited to, at least one of audio and video.

In some embodiments, the multimedia conference may be an instant conference or a scheduled conference. Here, the instant conference may be a conference that started immediately in response to an initiation. The scheduled conference may be a conference that is invited in response to an initiation and to be started at a predetermined time instant in the future.

In some application scenarios, the participants in the multimedia conference may be divided into at least two roles. For example, participants include a host and a participant. The host of the multimedia conference may be a conference initiator.

For example, A initiates an online conference reservation and sends invitations to B and C. In this case, A may be regarded as the initiator of the conference, that is, the host of the conference, and B and C each may be regarded as a participant of the conference.

In some embodiments, the above multimedia conference control may be displayed on a client terminal of the user who has the permission to start the conference. The user who has the permission to start the conference may include, but is not limited to, at least one of the host and the participant of the conference.

In this embodiment, the application for starting the multimedia conference may be any type of application, and is not limited herein. For example, the above application may include an instant video conferencing application, a communication application, a video playback application, a mail application and the like.

In this embodiment, the server starts the multimedia conference in response to determination to start the multimedia conference based on the multimedia conference starting request.

Here, the server may verify the multimedia conference starting request in response to receipt of the multimedia conference starting request, and determine to start the multimedia conference based on the multimedia conference starting request in response to determination that the conference starting condition is satisfied.

In some embodiments, the conference starting condition may be preset. The conference starting condition may include, but is not limited to, at least one of: the current moment is the scheduled conference starting time instant, and a user who sends the multimedia conference starting request is not in a preset blacklist.

Here, starting a multimedia conference may include receiving and forwarding a multimedia conference stream of a participant. For example, A, B, and C are the participants. The server may forward the multimedia conference streams of B and C to A for A to display in the multimedia conference interface. The server may forward the multimedia conference streams of A and C to B for B to display in the multimedia conference interface. The server may forward the multimedia conference streams of A and B to C for C to display in the multimedia conference interface.

Here, the multimedia conference stream may include a collection of multimedia conference data. It should be understood that during the multimedia conference, the participant may send a steady stream of multimedia conference data to the server. In this case, the collection of data sent by the participant to the server may be vividly referred to as a multimedia conference stream.

In some embodiments, the multimedia conference stream may include, but is not limited to, at least one of: an audio conference stream and a video conference stream.

In step 102, conference live confirmation information is sent to the server in response to detection of a confirmation operation on a conference live confirmation control.

In this embodiment, the object (for example, the terminal device) for performing the interaction method may send conference live confirmation information to the server in response to detection of a confirmation operation on the conference live confirmation control.

Here, the conference live confirmation information is for instructing the user to confirm to broadcasting the conference live. That is, the user authorizes the server to live broadcast the multimedia conference to persons in addition to the participants.

In this embodiment, the server receives the conference live confirmation information, and in response to receipt of the multimedia conference stream, generates a live stream based on the received multimedia conference stream.

In some embodiments, the server may receive the conference live confirmation information before the multimedia conference is started or during the multimedia conference. If the conference live confirmation information is received before the multimedia conference is started, the server has not received the multimedia conference stream, and therefore fails to start the multimedia conference. In this case, the server may start live broadcast of the conference after the multimedia conference is started and the multimedia conference stream is received rather than start the live broadcast immediately after receiving the conference live confirmation information.

Here, the multimedia conference stream is sent to the server by the participant of the multimedia conference.

Here, generation of the live stream based on the received multimedia conference stream may be implemented in various manners.

In some embodiments, the received multimedia conference stream sent by at least one participant may be combined into a live stream. For example, the multimedia conference streams of the three participants A, B, and C may be combined into a live stream.

It should be noted that, in the interaction method according to this embodiment, the multimedia conference starting control and the conference live confirmation control are provided, after the user starts a conference and determines to broadcast the conference live, the server generates the live stream based on the multimedia conference stream, so that more users receive the multimedia conference stream while ensuring the smoothness of the multimedia conference.

It should be noted that, for an online multimedia conference, the communication pressure of the conference increases with an increase in the number of participants. Therefore, in order to ensure the smoothness of the multimedia conference, the number of participants are limited under certain communication resources, resulting in failure to proceed smoothly a multimedia conference for a large group. According to the solutions of the present disclosure, the multimedia conference stream is converted into a live stream, avoiding the restriction on the number of users receiving the multimedia conference while reducing the communication pressure of the multimedia conference and ensuring the smoothness of the multimedia conference.

In some embodiments, the server includes a conference server and a live server.

Here, the conference server may be configured to maintain conference logic of the multimedia conference. The conference server may exchange information with the participant. Here, the conference logic may include, but is not limited to, at least one of: generation of a conference identifier, a time instant at which the conference is started, information forwarding logic between participants, and the like.

Here, the live server may be configured to provide a live function. The live server may exchange information with an audience. For example, the live server may receive a live stream acquisition request from an object to watch the conference (where an object that sends a live stream acquisition request but may not obtain the live stream), and then authenticates the live stream acquisition request to determine whether to return the live stream.

In some embodiments, the live stream may be generated by the conference server. The conference server: generates the live stream based on the received multimedia conference stream in response to receipt of the conference live confirmation information and in response to receipt of the multimedia conference stream; and sends the generated live stream to the live server.

It should be noted that the live stream is generated by the conference server and then sent to the live server, reducing the communication pressure of the conference server compared with the conference server interacting directly with the audience. For example, there are two audiences. In a case of no live server, the conference server sends two live streams to the two audiences respectively. In a case of a live server, the conference live broadcaster sends one live stream only to the live server, and then the live server sends the live stream to the two audiences. It can be seen that, the communication volume of the conference server can be reduced due to the live server, thereby ensuring the smoothness of the multimedia conference.

In some embodiments, the live stream may be generated by the live server. The conference server sends the multimedia conference stream to the live server based on the received multimedia conference stream in response to receipt of the conference live confirmation information and in response to receipt of the multimedia conference stream. The live server generates the live stream based on the received multimedia conference stream.

It should be noted that the conference server sends the multimedia conference stream to the live server, and then the live server generates the live stream, which can reduce the computing pressure of the conference server, thereby further ensuring the smoothness of the multimedia conference.

In some embodiments, the conference server may include a conference logic server and a media server. Here, the conference logic server may be configured to support some conference logic, for example, conference user information and so on. The media server may be configured to support forwarding of the multimedia data stream. For example, the multimedia data streams of some participants may be forwarded to other participants. In some embodiments, the media server may generate the live stream and then send the live stream to the live server. Alternatively, in other embodiments, the media server may send the received multimedia data stream of at least a part of the participants to the live server, and the live server generates the live stream based on the received multimedia data stream. In some embodiments, the server generates live access information in response to receipt of the live confirmation information, and sends the live access information to at least one of: a participant, a target audience, and a target network resource output terminal. The live access information indicates a manner in which the live stream is acquired.

In some embodiments, the target network resource output terminal includes at least one of: a target webpage and a preset interface of a target application.

Here, the live access information is directly sent to a pre-configured webpage or a preset interface of an application. Any user, accessing this webpage, can see the live access information.

For example, the target webpage may be a home page of a website, and the preset interface of the target application may be an application starting interface of the target application.

It should be noted that the live access information is sent to the target network resource output terminal, and is displayed on the target network resource output terminal, thereby indiscriminately prompting the user to watch the live stream.

In some embodiments, the target audience includes a preconfigured user set.

Here, the pre-configured user set may be configured by the server, or may be configured by the participant.

In some application scenarios, the server may send the live access information to a group in a preconfigured organizational structure tree. The organizational structure tree may be generated by the server based on an organizational structure of a user who uses the service provided by the server. For example, each organizational structure tree may include a root node representing enterprise identity information, a child node representing a department and/or a branch of the enterprise, and a leaf node representing identity information of an employee of the enterprise. It can be understood that the specific structure of the organizational structure tree of an enterprise may be configured and uploaded to the server by an individual with certain authority in the enterprise. Correspondingly, in the enterprise, an employee who do not have the authority cannot modify the organizational structure tree. In these application scenarios, the server may select one or more child nodes in the organizational structure tree and send the live access information to a leaf node belonging to the selected child node.

In some application scenarios, some employees in a predetermined range in the enterprise can participate in the online conference. Before the online conference starts or during the online conference, the server sends live access information of the online conference to some groups determined based on the organizational structure tree of the enterprise, so as to send an invitation to watch the live broadcast of the online conference to other members in the enterprise (that is, not limited to the members in the enterprise who participating in the online conference).

It should be noted that the user set is pre-configured, and then the live access information is sent to users in the user set, so that the live access information can be pushed in a targeted manner, which not only avoids a process of the participant specifying the audience for each conference, but also speeds up a speed at which the live access information is transmitted to the user.

In some embodiments, the server sends the live access information to the participant of the multimedia conference, and the method further includes: displaying the received live access information.

Here, the server may send the live access information to the participant. It should be understood that the server can acquire the participant before the conference is started or during the conference. The participant then shares the live access information. In this way, the participant shares the live access information to a sharing object, and the sharing object watch the live broadcast of the conference based on the live access information.

It should be noted that, the participant can specify the audience by sharing the live access information with the sharing object, thereby controlling a dissemination range of the live stream and ensuring the security of content in the multimedia conference.

In some embodiments, a live stream request object, in response to receipt of the live access information, sends a live stream acquisition request to the server based on the live access information in response to detection of a trigger operation for the live access information.

In some embodiments, the server determines based on the live stream acquisition request whether to send the live stream to the live stream request object. That is, the server authenticates the live stream acquisition request, so as to determine whether the live stream request object has the permission to acquire the live stream, thereby ensuring the data security of the live stream.

Here, the authentication of the live broadcast acquisition request by the server may be implemented in various manners.

In some embodiments, the live stream request object plays the live stream in response to receipt of the live stream.

In some embodiments, the live stream request object displays live failure indication information in response to failure to receive the live stream.

Here, the live stream request object may refer to an object that receives the live access information and initiates a live request. It should be understood that, a terminal that receives the live access information may receive the live access information through various channels respectively corresponding to various ways in which the server sends the live access information.

It should be understood that the live access information may be shared by the participant to a terminal user. Alternatively, the live access information is sent to the terminal user by the server sending the live access information to a preconfigured user set. Alternatively, the live access information is displayed on a webpage opened by the terminal user. That is, when the webpage is not opened, the terminal user is not directly reminded to receive the live access information.

It should be understood that an object that receives the live access information is unnecessarily the live stream request object, because some objects do not send a live stream acquisition request after receiving the live access information. The live stream request object that sends the live stream acquisition request is unnecessarily an audience, because some live stream request objects that send the live stream acquisition request do not obtain the live stream.

In some embodiments, the server generates the live stream based on the received multimedia conference stream, including: acquiring the multimedia conference stream sent by the participant; determining a participant currently speaking; and generating the live stream based on the received multimedia conference stream and relevant information of the participant currently speaking.

In some embodiments, the multimedia conference includes at least one of an audio conference and an audio-video conference. It should be understood that the audio-video conference refers to a conference including both audio interaction and video interaction. In some embodiments, the multimedia conference may be an audio-video conference.

Here, the participant currently speaking may be presented in a preset manner in a live conference interface. That is, the live conference interface may display video images of some or all of the participants, and specify the participant currently speaking in the preset manner.

For example, the preset manner may include, but is not limited to: displaying an identifier of the participant who is currently speaking, displaying a certain mark on an image of the participant who is currently speaking, displaying a video of the participant who is currently speaking in a preset area of the live conference interface, and displaying only the image of the participant who is currently speaking when the live conference interface is zoomed in to a small window. It should be understood that since there is generally a delay in generating and displaying the live stream based on the multimedia conference stream, the "current" moment in the "participant who is currently speaking" here is synchronized with the multimedia conference stream. For example, during the multimedia conference, a participant A who speaks at a time instant t1, and the content of the multimedia conference corresponding to the time instant t1 is presented in the live stream at a time instant t2. Therefore, at the time instant t2 of the live stream, the participant who is currently speaking refers to the participant A who speaks at the time instant t1 of the multimedia conference.

It should be noted that the live stream is generated based on the participant who is currently speaking, ensuring that during the live broadcast, key information (for example, who is the participant currently speaking) in the current conference is provided with key prompts.

In some embodiments, the multimedia conference includes an audio-video conference, and the live stream includes at least one of: conference screen shared information, multimedia information of the participant, and related information of the participant who is currently speaking.

Here, the conference screen shared information may be information jointly displayed on the screen due to the sharing of the participant. The conference screen shared information may be all or part of the information shared by the participant.

For example, the conference screen shared information may include, but is not limited to, at least one of a shared document and shared screen information.

In some embodiments, the conference screen shared information is a predefined category of information in the shared information of the participant.

Here, the predefined category may be pre-designated. For example, the predefined category may be shared screen information. Here, the shared screen information may be stream data obtained by recording all or part of the content presented on a terminal display of the participant who is sharing the screen. It should be noted that the predefined category of information is set as the conference screen shared information, so that confidential information in the information shared by the participant can be screened out, thereby ensuring that the confidential information is not broadcast live and ensuring the security of the confidential information.

In some embodiments, the method further includes: displaying the conference live confirmation control in response to detection of a triggering operation on a preset live request control.

In some application scenarios, the live request control is displayed before the multimedia conference is started. Then, the conference live confirmation control is displayed before the multimedia conference is started. Alternatively, there may be a time interval between a time instant at which the live request control is displayed and a time instant at which the conference live confirmation control is displayed, and the multimedia conference may be started in this time interval. Therefore, the conference live confirmation control is displayed during the multimedia conference.

In some application scenarios, the live request control is displayed during the multimedia conference. Then, the conference live confirmation control is displayed during the multimedia conference.

It should be noted that, after displaying the live request control, the user is provided with second confirmation about starting live broadcast of the conference by further displaying the live confirmation control in response to triggering by the user, thereby avoiding mistaken triggering of live broadcast of the conference without knowledge of the user, and ensuring confidentiality of the conference that the user does not expect to live broadcast.

In some embodiments, the conference live confirmation control is displayed in response to receipt of live request information sent by other participant.

Here, the live request information is for requesting the execution subject to start the live broadcast of the conference.

Here, other participant may be a participant other than the execution subject. Before the multimedia conference is started or during the multimedia conference, other participant may send the live request information to the execution subject. After receiving the live request information, the execution subject displays the conference live confirmation control.

It should be noted that by sending the live request information by other participant, the participant as the execution subject is reminded to start live broadcasting the conference in time. The audience of the multimedia conference is increased by live broadcasting the conference.

In some embodiments, the conference live confirmation control is displayed in response to determination that a first conference condition that is preset is satisfied.

Here, the first conference condition may be for the execution subject to determine whether to start live broadcasting the conference. Here, the execution subject determines a time instant for starting live broadcasting the conference based on the first conference condition. The time instant for starting live broadcasting the conference is before the multimedia conference is started or during the multimedia conference.

In some embodiments, the first conference condition includes at least one of: the number of participants in the multimedia conference is greater than a preset first threshold; a freezing rate of the multimedia conference is greater than a preset first freezing rate threshold; and a delay rate of the multimedia conference is greater than a preset first delay rate threshold.

Here, the freezing rate is for characterizing a degree of freezing when the multimedia stream is played. The freezing rate may be calculated depending on actual situation, and is not limited herein. For example, the freezing rate is determined based on the number of frames of multimedia data played in a unit time.

Here, the delay rate is for characterizing a degree of delay when the multimedia stream is played. The delay rate is calculated depending on actual situations, and is not limited herein. For example, the delay rate is generated by comparing a time instant at which the multimedia data is sent with a time instant at which the multimedia data is played.

It should be understood that, before the multimedia conference is started, the number of participants in the multimedia conference may be determined based on the number of users reserved to participate in the multimedia conference.

It should be understood that, it may be determined during the multimedia conference whether the freezing rate of the multimedia conference is greater than the preset first freezing rate threshold, and whether the delay rate of the multimedia conference is greater than the preset first delay rate threshold.

It should be noted that the executive subject determines whether to display the conference live confirmation control based on the first conference conditions, and therefore display the conference live confirmation control in time when determining to live broadcast the conference so as to remind the user. In this way, the smoothness of the conference can be ensured through the rapid response.

In some embodiments, the method further includes: displaying the conference live confirmation control in response to receipt of live inquiry information sent by the server. The live inquiry information is generated by the server in response to determination that a preset second conference condition is satisfied.

Here, the live inquiry information is pre-agreed by the server with the execution subject, and is for triggering the execution subject to display the live confirmation control.

Here, the second conference condition is for the server to determine whether to start live broadcasting the conference, before the multimedia conference is started or during the multimedia conference.

In some embodiments, the number of participants in the multimedia conference is greater than a preset second threshold, the freezing rate of the multimedia conference is greater than a preset second freezing rate threshold, and the delay rate of the multimedia conference is greater than the preset second delay rate threshold.

It should be understood that the server may determine during the multimedia conference whether the freezing rate of the multimedia conference is greater than the preset second freezing rate threshold, and whether the delay rate of the multimedia conference is greater than the preset second delay rate threshold.

It should be noted that the server sends a confirmation result for whether to display the conference live confirmation control to the participant based on the second conference condition, and collects accurate and comprehensive data to determine the reminder timing for starting the conference. Therefore, the accuracy of the reminder timing is improved.

In some application scenarios, the first delay rate threshold is smaller than the second delay rate threshold, and the first freezing rate threshold is smaller than the second freezing rate threshold. It should be noted that, the delay rate threshold for the execution subject is smaller than the delay rate threshold for the server, which is sensitive to the timing at which the live broadcast of conference is started.

In some embodiments, the timing at which the conference live confirmation control is displayed is before starting the multimedia conference or during the multimedia conference.

It should be noted that, the conference live confirmation control is displayed before the multimedia conference is started, to remind the participant of the conference and form a pre-reminder for the user, so that the user can fully consider whether to broadcast the live conference. In addition, in a case that the user confirms to live broadcast the conference before the conference is started, the server pre-configures the computing resources, storage resources and communication resources for the live broadcast of the conference, thereby ensuring the integrity and smoothness of the live broadcast when the live broadcast of the conference is started.

It should be noted that during a multimedia conference, the live conference control is displayed for determining whether to start live broadcasting the conference depending on actual situations of the conference, thereby providing an opportunity of flexible choices depending on actual situations of the conference.

In some embodiments, the displaying the received live access information includes: transmitting the live access information in a calendar event indicating the multimedia conference in response to receipt of the live access information and in response to determination that the multimedia conference is not started; and displaying the live access information in a display interface of the calendar event.

Here, the display interface of the calendar event may display a series of events marked by the user on the calendar. The calendar event indicating the multimedia conference is for reminding the user of a time instant at which the multimedia conference is started. The live access information is displayed on the display interface of the calendar event, so that the live access information for inviting the audience to the conference is displayed to the user while the user is reminded of the multimedia conference.

In some embodiments, the displaying the received live access information further includes: displaying the live access information on a multimedia conference interface in response to receipt of the live access information and in response to determination that the multimedia conference in progress.

Here, if the live access information is received during the multimedia conference, the live access information may be provided in time when the conference is to be live broadcasted during the conference, and the participant share the live access information in time for the audience to receive the live stream.

In some embodiments, before sending the sharing request including the identification of the sharing object to the server in response to detection of a predefined shared confirmation operation, the method further includes: presenting an identification of a candidate sharing object in response to detection of a predefined sharing starting operation; and determining an identification of a candidate sharing object targeted by the selection operation as the identification of the sharing object in response to detection of a predefined selection operation.

For example, the sharing starting operation may be that the user clicks a "start sharing control". After the user clicks the "start sharing control", the terminal presents the identifications of candidate sharing objects, such as a user A, a user B, and a user C. The identification of the sharing object, for example, the user A, is selected through the selection operation from the presented identifications of candidate sharing objects.

Here, the identification of the candidate sharing object is determined based on a preset shareable user range and a user associated with the participant.

In some embodiments, the shareable user range is determined based on at least one of: a pre-established organizational structure and a pre-established relationship between users.

Here, the organizational structure may be a structure established by an enterprise-side (B-side) user with each member of an organization as a node.

In some application scenarios, presenting the identification of the candidate sharing object may include calling up an organizational structure tree of the participant, and then allowing the participant to select.

In some application scenarios, presenting the identification of the candidate sharing object may include displaying an identification of a user who has a relationship with the participant, and then allowing the participant to select.

In some embodiments, the sharing object generates and displays forwarding restriction information in response to detection of a forwarding operation for the live access information. The forwarding restriction information indicates that there is no permission to share the live access information.

In some embodiments, the sharing object includes an audience.

In some application scenarios, the live access information is displayed to a specific participant (for example, a host), rather than a common participant (for example, a user participating in the conference). In this application scenario, the specific participant can share the live access information with the common participant as the sharing object. The common participant receives the live stream based on the live access information. In this way, the common participant switches to a live mode to watch the conference without participating in the conference.

In some application scenarios, the live access information is displayed to all participants. The participants may send the live access information to an audience. In this application scenario, the audience has no permission to re-forward the live access information.

It should be noted that, indiscriminate dissemination of the live access information can be restricted by controlling the forwarding, thereby reducing the calculation amount of the server for authentication.

In some application scenarios, a presentation style of the live access information is set depending on permission of the sharing object. The permission of the sharing object may be forwarding or restricting to forward. The permission of the sharing objects may be set in various ways, which are not limited herein.

Alternatively, in some embodiments, before being forwarded to the sharing object, the live access information is encapsulated, so that a storage location of the live stream indicated by the encapsulated live access information is invisible to the sharing object, thereby avoiding re-forwarding of the live stream by the sharing object. In some application scenarios, the permission of the sharing object is restricting to forward. The sharing object encapsulates indication information of the live stream into a card for display. The card is provided with a live stream request control rather than a forwarding control.

It should be noted that, the presentation style of the live access information is determined through encapsulation based on permission of the sharing object, no control for triggering forwarding is provided, so as to omit a step of reminding the terminal to present no permission for forwarding. Therefore, the step of the terminal responding to the forwarding operation is omitted to reduce the calculation amount of the terminal.

In some embodiments, the live stream acquisition request includes a user identification. The determining, by the server, whether to send the live stream to the sharing object based on the live stream acquisition request includes: determining, by the server based on the user identification in the live stream acquisition request, whether to return the live stream.

In some embodiments, the determining, by the server based on the user identification in the live stream acquisition request, whether to return the live stream includes: determining, by the server in response to receipt of the live stream acquisition request including the user identification, whether to return the live stream based on a pre-generated whitelist.

Here, the whitelist records a user who has permission to watch the live stream.

It should be noted that, the live stream acquisition request is authenticated based on the whitelist, thereby improving the authentication speed.

In some embodiments, the method further includes: sending sharing object range information to the server. The server determines a sharing object range based on the received sharing object range information, and generates the whitelist based on a user identification within the sharing object range.

Here, the sharing object range information indicates the sharing object range. It should be noted that, the sending of the sharing object range information may be for a single conference, or may be unified setting for the live conference function.

In some application scenarios, the execution subject may display an identification of a candidate sharing object range to the user, for the user to select. The execution subject may send a selection result of the user to the server as the sharing object range information. The server stores the relationship between users, and also stores the organizational structure tree (user identifications in each branch on the organizational structure tree). After receiving the sharing object range information, the server determines a user within the sharing object range based on a user identification that sent the request and the sharing object range information.

In some embodiments, the sharing object range information includes at least one of: a group identification and an organization identification.

Here, the group identification may indicate a group. A group may be a collection of users established by a client (C-side) user.

Here, the organization identification may indicate an organizational structure tree. The organizational structure tree may be in the form of a group generated by an organizational structure established by the enterprise-side (B-side) user.

In some application scenarios, in a case that the user who sends the live stream acquisition request is in the organizational structure tree indicated by the organization identification, the live stream is returned to the user. In a case that the user who sends the live stream acquisition request is not in the organizational structure tree indicated by the organization identification, the live stream is not returned to the user.

In some application scenarios, in a case that the user who sends the live stream acquisition request is in the group indicated by the group identification, the live stream is returned to the user. In a case that the user who sends the live stream acquisition request is not in the group indicated by the group identification, the live stream is not returned to the user.

It should be noted that the sharing object range information indicates the user having permission to watch the conference, not only the step of selecting users one by one is avoided and sharing efficiency is improved, but also a user who receives the live access information is authenticated without restricting forwarding. Therefore, the content of the conference is not open to a user outside the organizational structure or the group, and the confidentiality of the content of the conference is guaranteed.

In some embodiments, the whitelist includes the identification of the sharing object in the sharing request received by the server.

Here, the server may receive the sharing request sent by a participant, and then generate a whitelist with the identification of the sharing object in the received sharing request as an element.

It should be noted that the whitelist includes the identification of the sharing object in the sharing request received by the server. The sharing object specified by the participant is determined as the authorized user. The playing of the live stream is restricted to the sharing object specified by the participant while forwarding to an unrestricted sharing object, ensuring the confidentiality of the content of the conference.

In some embodiments, the live access information includes one of a uniform resource locator and a conference identification.

Here, the uniform resource locator indicates a live stream generated based on the multimedia conference. The conference identification indicates the multimedia conference.

Here, the uniform resource locator may include a live network address. The live network address may indicate a web page for playing the live stream.

In some embodiments, the playing, by the sharing object, the live stream in response to receipt of the live stream includes: the playing, by the sharing object in response to receipt of a live stream obtained based on the uniform resource locator or the conference identification, the live stream in a conference application or a multimedia playing application.

In some application scenarios, the sharing object plays the live stream in the application in response to receipt of the live stream.

In some embodiments, the playing, by the sharing object, the live stream in response to receipt of the live stream includes: displaying, by the sharing object in response to receipt of a live web page obtained based on the live network address, the live web page to play the live stream.

In some application scenarios, the sharing object plays the live stream in a webpage read by a browser in response to receipt of the live stream.

In some embodiments, the method further includes: sending, by the server, live situation information to the participant.

Here, the live situation information indicates relevant situation of the live broadcast started based on the multimedia conference.

In some embodiments, the method further includes: displaying the live situation information on the multimedia conference interface.

In some embodiments, the live situation information includes at least one of: the number of users viewing the live broadcast, and information of a user viewing the live broadcast.

Here, the number of users viewing the live broadcast is generated based on the number of terminals playing the live stream.

Here, the information of the user viewing the live broadcast may indicate various predefined information of audience viewing the live broadcast. The information of user viewing the live broadcast may include, but is not limited to, the identity information of the user viewing the live broadcast, age information of the user viewing the live broadcast, and level information of the user viewing the live broadcast. The identity information of the user viewing the live broadcast may include, but is not limited to, at least one of: an identification of the user viewing the live broadcast, an avatar of the user viewing the live broadcast, and the like.

It should be noted that the relevant information of the live broadcast of the conference is provided to the participant by displaying the live situation information on the multimedia conference interface of the participant, so that the participant can react based on the relevant situation of the live broadcast of the conference. For example, if a participant who thinks it is not suitable to play the content of the conference to an audience, the participant cancels the permission of the audience to watch the conference.

In some embodiments, a live stream playing interface includes an information input control. The information input control is configured to receive feedback information. In response to receipt of the feedback information sent by the sharing object, the server sends the feedback information to the participant. The method further includes: displaying the feedback information on the multimedia conference interface.

Here, the feedback information may be information about the live broadcast of the conference sent by the audience.

In some embodiments, the feedback information displayed on the multimedia conference interface may be in various forms. For example, the feedback information is bullet chat.

It should be noted that the feedback information may be provided to the participant as a comment of the audience on the live broadcast of the conference. In this way, conference feedback can be provided to the participant in a timely manner, thereby improving the interaction rate of the online conference.

In some embodiments, the feedback information and the live situation information may also be displayed on a live stream interface. In this way, a comment of other audiences on the live broadcast of the conference can be provided to the audience, and the live situation can be provided to the audience.

Figure 2:
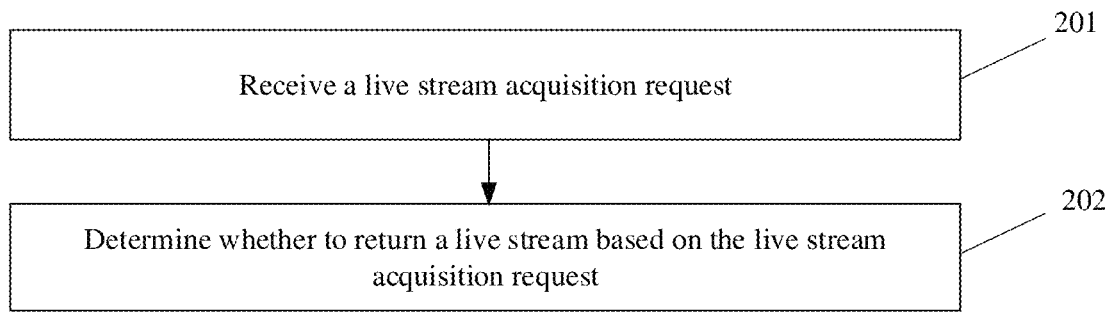
FIG. 2 is a flowchart of a permission control method according to an embodiment of the present disclosure.

Reference is made to FIG. 2, which is a flowchart of a permission control method according to an embodiment of the present disclosure. This interaction method is applied to a server. As shown in FIG. 1, the permission control method includes the following steps 201 to 202.

In step 201, a live stream acquisition request is received.

In step 202, it is determined based on the live stream acquisition request whether to return a live stream.

In some embodiments, the method further includes: generating live access information; and sending the live access information to a candidate audience.

It should be noted that the embodiment shown in FIG. 2 may be combined with other technical features or application scenarios in the present disclosure, and details are not repeated here.

Here, the candidate audience may be a user determined by the server and expecting to receive the live stream.

In some embodiments, the candidate audience, in response to detection of a predefined sharing starting operation for the live access information: presents an identification of a candidate sharing object, where the identification of the candidate object is determined based on a preset shareable user range; in response to detection of a predefined selection operation, determines an identification of a candidate sharing object targeted by the selection operation as the identification of the sharing object; and sends a sharing request including the identification of the sharing object to the server.

For example, the sharing starting operation may be that the user clicks a "start sharing control". After the user clicks the "start sharing control", the terminal presents the identifications of candidate sharing objects, such as a user A, a user B, and a user C. The identification of the sharing object, for example, the user A, is selected through the selection operation from the presented identifications of candidate sharing objects.

Here, the identification of the candidate sharing object is determined based on the preset shareable user range and a user associated with the participant.

In some embodiments, the sharing object indicated by the identification of the sharing object generates and displays restricted forwarding information in response to detection a forwarding operation for the live access information. The forwarding restriction information indicates that there is no permission to share the live access information.

In some embodiments, the live stream acquisition request includes a user identification. The determining whether to return the live stream based on the live stream acquisition request includes: determining whether to return the live stream based on the user identification in the live stream acquisition request.

In some embodiments, the determining whether to return the live stream based on the live stream acquisition request includes: in response to receipt of the live stream acquisition request including the user identification, determining whether to return the live stream based on a pre-generated whitelist.

In some embodiments, the method further includes: determining a sharing object range based on sharing object range information sent by the candidate audience; and generating a whitelist based on the user identification in the sharing object range.

In some embodiments, the sharing object range information includes at least one of: a group identification and an organization identification.

In some embodiments, the whitelist includes the identification of the sharing object in the sharing request received by the server.

In some embodiments, the live stream is generated as follows. The server receives the conference live confirmation information, and in response to receipt of the multimedia conference stream, generates the live stream based on the received multimedia conference stream.

In some embodiments, before sending the sharing request including the identification of the sharing object to the server in response to detection of the predefined sharing confirmation operation, the method further includes: presenting an identification of a candidate sharing object in response to detection of a predefined sharing starting operation; and in response to detection of a predefined selection operation, determining the identification of the candidate sharing object targeted by the selection operation as the identification of the sharing object.

In some embodiments, the shareable user range is determined based on at least one of: a pre-established organizational structure and a pre-established relationship between users.

Here, the organizational structure may be a structure established by an enterprise-side (B-side) user with each member of an organization as a node.

In some application scenarios, presenting the identification of the candidate sharing object may include calling up an organizational structure tree of a candidate audience, and then allowing the candidate audience to select.

In some application scenarios, presenting the identification of the candidate sharing object may include displaying an identification of a user who has a relationship with the candidate audience, and then allowing the candidate audience to select.

In some embodiments, the sharing object generates and displays forwarding restriction information in response to detection of a forwarding operation for the live access information. The forwarding restriction information indicates that there is no permission to share the live access information.

In some embodiments, the sharing object includes an audience.

In some application scenarios, the live access information is displayed to a specific candidate audience (for example, a host), rather than a common candidate audience (for example, a user participating in the conference). In this application scenario, the specific candidate audience can share the live access information with the common candidate audience as the sharing object. The common candidate audience receives the live stream based on the live access information. In this way, the common candidate audience switches to a live mode to watch the conference without participating in the conference.

In some application scenarios, the live access information is displayed to all candidate audiences. The candidate audiences may send the live access information to a viewer. In this application scenario, the viewer has no permission to re-forward the live access information.

It should be noted that, indiscriminate dissemination of the live access information can be restricted by controlling the forwarding, thereby reducing the calculation amount of the server for authentication.

In some application scenarios, a presentation style of the live access information is set depending on permission of the sharing object. The permission of the sharing object may be forwarding or restricting to forward. The permission of the sharing objects may be set in various ways, which are not limited herein.

In some application scenarios, the permission of the sharing object is restricting to forward. The sharing object encapsulates indication information of the live stream into a card for display. The card is provided with a live stream request control rather than a forwarding control.

It should be noted that, the presentation style of the live access information is determined through encapsulation based on permission of the sharing object, no control for triggering forwarding is provided, so as to omit a step of reminding the terminal to present no permission for forwarding. Therefore, the step of the terminal responding to the forwarding operation is omitted to reduce the calculation amount of the terminal.

In some embodiments, the live stream acquisition request includes a user identification. The determining, by the server, whether to send the live stream to the sharing object based on the live stream acquisition request includes: determining, by the server based on the user identification in the live stream acquisition request, whether to return the live stream.

In some embodiments, the determining, by the server based on the user identification in the live stream acquisition request, whether to return the live stream includes: determining, by the server in response to receipt of the live stream acquisition request including the user identification, whether to return the live stream based on a pre-generated whitelist.

Here, the whitelist records a user who has permission to watch the live stream.

It should be noted that, the live stream acquisition request is authenticated based on the whitelist, thereby improving the authentication speed.

In some embodiments, the method further includes: sending sharing object range information to the server. The server determines a sharing object range based on the received sharing object range information, and generates the whitelist based on a user identification within the sharing object range.

Here, the sharing object range information indicates the sharing object range. It should be noted that, the sending of the sharing object range information may be for a single conference, or may be unified setting for the live conference function.

In some application scenarios, the execution subject may display an identification of a candidate sharing object range to the user, for the user to select. The execution subject may send a selection result of the user to the server as the sharing object range information. The server stores the relationship between users, and also stores the organizational structure tree (user identifications in each branch on the organizational structure tree). After receiving the sharing object range information, the server determines a user within the sharing object range based on a user identification that sent the request and the sharing object range information.

In some embodiments, the sharing object range information includes at least one of: a group identification and an organization identification.

Here, the group identification may indicate a group. A group may be a collection of users established by a client (C-side) user.

Here, the organization identification may indicate an organizational structure tree. The organizational structure tree may be in the form of a group generated by an organizational structure established by the enterprise-side (B-side) user.

In some application scenarios, in a case that the user who sends the live stream acquisition request is in the organizational structure tree indicated by the organization identification, the live stream is returned to the user. In a case that the user who sends the live stream acquisition request is not in the organizational structure tree indicated by the organization identification, the live stream is not returned to the user.

In some application scenarios, in a case that the user who sends the live stream acquisition request is in the group indicated by the group identification, the live stream is returned to the user. In a case that the user who sends the live stream acquisition request is not in the group indicated by the group identification, the live stream is not returned to the user.

It should be noted that the sharing object range information indicates the user having permission to watch the conference, not only the step of selecting users one by one is avoided and sharing efficiency is improved, but also a user who receives the live access information is authenticated without restricting forwarding. Therefore, the live stream is not open to a user outside the organizational structure or the group, and the confidentiality of the live stream is guaranteed.

In some embodiments, the whitelist includes the identification of the sharing object in the sharing request received by the server.

Here, the server may receive the sharing request sent by a candidate audience, and then generate a whitelist with the identification of the sharing object in the received sharing request as an element.

It should be noted that the whitelist includes the identification of the sharing object in the sharing request received by the server. The sharing object specified by the candidate audience is determined as the authorized user. The playing of the live stream is restricted to the sharing object specified by the candidate audience while forwarding to an unrestricted sharing object, ensuring the confidentiality of the content of the conference.

Figure 3:
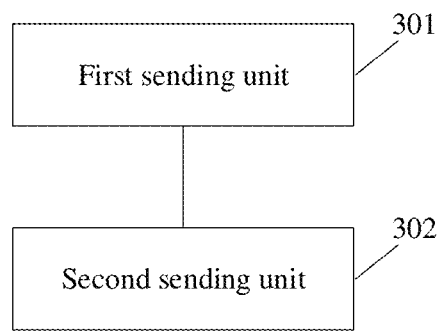
FIG. 3 is a schematic structural diagram of an interaction apparatus according to an embodiment of the present disclosure.

Reference is made to FIG. 3, as an implementation of the method shown in the above Figures, an interaction apparatus is provided according to an embodiment of the present disclosure. This apparatus embodiment corresponds to the method embodiment shown in FIG. 1. The apparatus is applied to various electronic devices.

As shown in FIG. 3, the interaction apparatus in this embodiment includes: a first sending unit and a second sending unit. The first sending unit is configured to send a multimedia conference starting request to a server in response to detection of a triggering operation on a multimedia conference control. The server starts a multimedia conference in response to determination of starting the multimedia conference based on the multimedia conference starting request. The second sending unit is configured to send conference live confirmation information to the server in response to detection of a confirmation operation on a conference live confirmation control. In response to receipt of the conference live confirmation information by the server and in response to receipt of a multimedia conference stream, a live stream is generated based on the received multimedia conference stream. The multimedia conference stream is sent to the server by a participant of the multimedia conference.

In this embodiment, the processing of the first sending unit 301 and the second sending unit 302 of the interaction apparatus and the technical effects brought about by the first sending unit 301 and the second sending unit 302 of the interaction apparatus may refer to the relevant descriptions of step 101 and step 102 in the embodiment shown in FIG. 1. Details are not repeated here.

In some embodiments, the server generates live access information in response to receipt of the live confirmation information, and sends the live access information to at least one of: a participant, a target audience, and a target network resource output terminal. The live access information indicates a manner in which the live stream is acquired.

In some embodiments, the server sends the live access information to the participant of the multimedia conference. The apparatus is further configured to: display the received live access information.

In some embodiments, the apparatus is further configured to: in response to detection of a predefined sharing confirmation operation, send a sharing request including an identification of a sharing confirmation object to the server. In response to receipt of the sharing request, the server sends the live access information to the sharing object. An identification of the sharing object indicates a sharing object targeted by the sharing confirmation operation.

In some embodiments, a live stream request object, in response to receipt of the live access information, sends a live stream acquisition request to the server based on the live access information in response to detection of a trigger operation for the live access information. The server determines based on the live stream acquisition request whether to send the live stream to the live stream request object; and plays the live stream in response to receipt of the live stream.

In some embodiments, the live stream request object displays live failure indication information in response to failure to receive the live stream.

In some embodiments, the target network resource output terminal includes at least one of: a target webpage, and a preset interface of a target application.

In some embodiments, the target audience includes a preconfigured user set.

In some embodiments, the server includes a conference server and a live server.

In some embodiments, the conference server: generates the live stream based on the received multimedia conference stream in response to receipt of the conference live confirmation information and in response to receipt of the multimedia conference stream; and sends the generated live stream to the live server.

In some embodiments, the conference server sends the multimedia conference stream to the live server based on the received multimedia conference stream in response to receipt of the conference live confirmation information and in response to receipt of the multimedia conference stream. The live server generates the live stream based on the received multimedia conference stream.

In some embodiments, the server generates the live stream based on the received multimedia conference stream, including: acquiring the multimedia conference stream sent by the participant; determining a participant currently speaking; and generating the live stream based on the received multimedia conference stream and relevant information of the participant currently speaking.

In some embodiments, the multimedia conference includes at least one of: an audio conference and an audio-video conference.

In some embodiments, the multimedia conference includes an audio-video conference, and the live stream includes at least one of: conference screen shared information, multimedia information of the participant, and related information of the participant who is currently speaking.

In some embodiments, the conference screen shared information is a predefined category of information in the shared information of the participant.

In some embodiments, the apparatus is further configured to: display the conference live confirmation control in response to detection of a triggering operation on a preset live request control.

In some embodiments, the apparatus is further configured to display the conference live confirmation control in response to receipt of live request information sent by another participant.

In some embodiments, the apparatus is further configured to display the conference live confirmation control in response to determination that the preset first conference condition is satisfied.

In some embodiments, the first conference condition includes at least one of: the number of participants in the multimedia conference is greater than a preset first threshold; a freezing rate of the multimedia conference is greater than a preset first freezing rate threshold; and a delay rate of the multimedia conference is greater than a preset first delay rate threshold.

In some embodiments, the apparatus is further configured to: display the conference live confirmation control in response to receipt of live inquiry information sent by the server. The live inquiry information is generated by the server in response to determination that a preset second conference condition is satisfied.

The second conference condition includes at least one of: the number of participants in the multimedia conference is greater than a preset second threshold; the freezing rate of the multimedia conference is greater than a preset second freezing rate threshold; and the delay rate of the multimedia conference is greater than the preset second delay rate threshold.

In some embodiments, the timing at which the conference live confirmation control is displayed includes at least one of: before starting the multimedia conference or during the multimedia conference.

In some embodiments, the displaying the received live access information includes: transmitting the live access information in a calendar event indicating the multimedia conference in response to receipt of the live access information and in response to determination that the multimedia conference is not started; and displaying the live access information in a display interface of the calendar event.

In some embodiments, the displaying the received live access information further includes: displaying the live access information on a multimedia conference interface in response to receipt of the live access information and in response to determination that the multimedia conference is in progress.

In some embodiments, before sending the sharing request including the identification of the sharing object to the server in response to detection of a predefined shared confirmation operation, the apparatus is further configured to: display an identification of a candidate sharing object in response to detection of a predefined sharing starting operation, where the identification of the candidate sharing object is determined based on a preset shareable user range and a user associated with the participant; and determine an identification of a candidate sharing object targeted by the selection operation as the identification of the sharing object in response to detection of a predefined selection operation.

In some embodiments, the shareable user range is determined based on at least one of: a pre-established organizational structure and a pre-established relationship between users.

In some embodiments, the sharing object generates and displays forwarding restriction information in response to detection of a forwarding operation for the live access information. The forwarding restriction information indicates that there is no permission to share the live access information.

In some application scenarios, a presentation style of the live access information is set depending on permission of the sharing object.

In some embodiments, the permission of the sharing object includes restricting to forward. The sharing object encapsulates indication information of the live stream into a card for display. The card is provided with a live stream request control rather than a forwarding control.

In some embodiments, the sharing object includes an audience.

In some embodiments, the live stream acquisition request includes a user identification. The determining, by the server, whether to send the live stream to the sharing object based on the live stream acquisition request includes: determining, by the server based on the user identification in the live stream acquisition request, whether to return the live stream.

In some embodiments, the determining, by the server based on the user identification in the live stream acquisition request, whether to return the live stream includes: determining, by the server in response to receipt of the live stream acquisition request including the user identification, whether to return the live stream based on a pre-generated whitelist.

In some embodiments, the apparatus is further configured to: send sharing object range information to the server. The server determines a sharing object range based on the received sharing object range information, and generates the whitelist based on a user identification within the sharing object range.

In some embodiments, the sharing object range information includes at least one of: a group identification and an organization identification.

In some embodiments, the whitelist includes the identification of the sharing object in the sharing request received by the server.

In some embodiments, the live access information includes one of a uniform resource locator and a conference identification. The live network address indicates a web page for playing the live stream. The uniform resource locator indicates a live stream generated based on the multimedia conference. The conference identification indicates the multimedia conference.

In some embodiments, the playing, by the sharing object, the live stream in response to receipt of the live stream includes: the playing, by the sharing object in response to receipt of a live stream obtained based on the uniform resource locator or the conference identification, the live stream in a conference application or a multimedia playing application.

In some embodiments, the playing, by the sharing object, the live stream in response to receipt of the live stream includes: displaying, by the sharing object in response to receipt of a live web page obtained based on the live network address, the live web page to play the live stream.

In some embodiments, the server sends live situation information to the participant. The live situation information indicates relevant situation of the live broadcast started based on the multimedia conference. The apparatus is further configured to display the live situation information on the multimedia conference interface.

In some embodiments, the live situation information includes at least one of: the number of users viewing the live broadcast, and information of a user viewing the live broadcast. The number of users viewing the live broadcast is generated based on the number of terminals playing the live stream.

Figure 4:
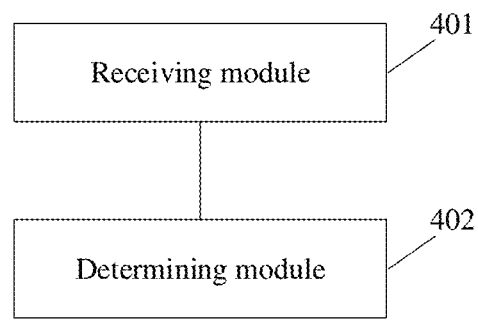
FIG. 4 is a schematic structural diagram of an authority control apparatus according to an embodiment of the present disclosure.

In some embodiments, a live stream playing interface includes an information input control. The information input control is configured to receive feedback information. In response to receipt of the feedback information sent by the sharing object, the server sends the feedback information to the participant. The apparatus is further configured to: display the feedback information on the multimedia conference interface. Reference is made to FIG. 4, as an implementation of the method shown in the above Figures, a permission control apparatus is provided according to an embodiment of the present disclosure. This apparatus embodiment corresponds to the method embodiment shown in FIG. 2. The apparatus may be applied to various electronic devices.

As shown in FIG. 4, the permission control apparatus according to this embodiment includes: a receiving module configured to receive a live stream acquisition request; and a determining module configured to determine whether to return a live stream based on the live stream acquisition request.

In this embodiment, the processing of the receiving module 401 and the determining module 402 of the permission control device and the technical effects brought about by the receiving module 401 and the determining module 402 of the permission control device may refer to the relevant descriptions of step 201 and step 202 in the embodiment shown in FIG. 2, and thus are not repeated here.

In some embodiments, the apparatus is further configured to: generate live access information; and send the live access information to a candidate audience.

In some embodiments, the candidate audience, in response to detection of a predefined sharing starting operation for the live access information: presents an identification of a candidate sharing object, where the identification of the candidate object is determined based on a preset shareable user range; in response to detection of a predefined selection operation, determines an identification of a candidate sharing object targeted by the selection operation as the identification of the sharing object; and sends a sharing request including the identification of the sharing object to the server.

In some embodiments, the shareable user range is determined based on at least one of: a pre-established organizational structure and a pre-established relationship between users.

In some embodiments, the sharing object indicated by the identification of the sharing object generates and displays restricted forwarding information in response to detection a forwarding operation for the live access information. The forwarding restriction information indicates that there is no permission to share the live access information.

In some embodiments, a presentation style of the live access information is set depending on permission of the sharing object.

In some embodiments, the permission of the sharing object is restricting to forward. The sharing object encapsulates indication information of the live stream into a card for display. The card is provided with a live stream request control rather than a forwarding control.

In some embodiments, the live stream acquisition request includes a user identification. The determining whether to send the live stream based on the live stream acquisition request includes: determining, based on the user identification in the live stream acquisition request, whether to return the live stream.

In some embodiments, the determining, based on the user identification in the live stream acquisition request, whether to return the live stream includes: determining, in response to receipt of the live stream acquisition request including the user identification, whether to return the live stream based on a pre-generated whitelist.

In some embodiments, the apparatus is further configured to: determine a sharing object range based on the sharing object range information sent by the by the candidate audience, and generate the whitelist based on a user identification within the sharing object range.

In some embodiments, the sharing object range information includes at least one of: a group identification and an organization identification.

In some embodiments, the whitelist includes the identification of the sharing object in the sharing request received by the server.

In some embodiments, the live stream is generated as follows. The server receives the conference live confirmation information, and in response to receipt of the multimedia conference stream, generates the live stream based on the received multimedia conference stream.

Figure 5:
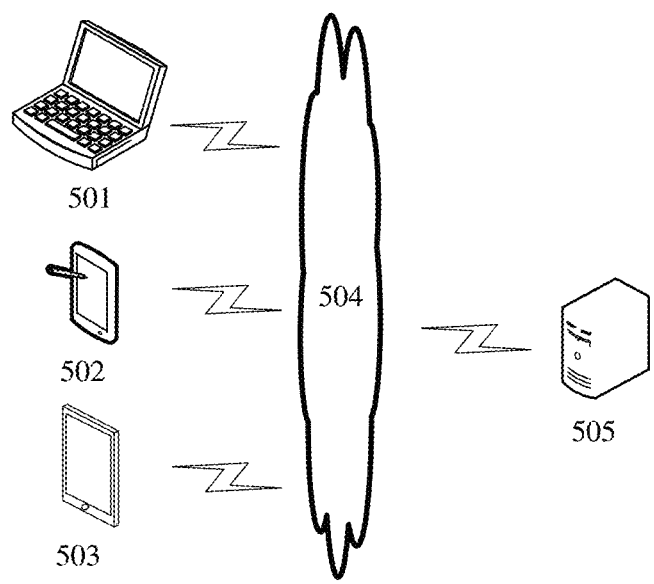
FIG. 5 shows a schematic system architecture to which the interaction method or the permission control method according to the embodiment of the present disclosure may be applied.

Reference is made to FIG. 5, which shows a schematic system architecture to which the interaction method according to the embodiment of the present disclosure may be applied.

As shown in FIG. 5, the system architecture includes terminal devices 501, 502, and 503, a network 504, and a server 505. The network 504 is a medium for providing a communication link between the terminal devices 501, 502, 503 and the server 505. The network 504 may be in various connection types, such as wired, wireless communication link, or fiber optic cable.

The terminal devices 501, 502, 503 each may interact with the server 505 through the network 504 to receive or send messages and the like. Various client applications such as a web browser application, a search application, and a news information application may be installed on the terminal devices 501, 502 and 503. The client application in the terminal devices 501, 502, and 503 may receive an instruction form a user, and perform functions according to the instruction, such as adding corresponding information to the information according to an instruction from the user.

The terminal devices 501, 502, and 503 each may be hardware or software. In a case that the terminal devices 501, 502, and 503 each are hardware, the terminal devices 501, 502, and 503 each include various electronic devices with a display screen and supporting web browsing, including but not limited to a smart phone, a tablet computer, an e-book reader, an MP3 player (Moving Picture Experts Group Audio Layer III), an MP4 player (Moving Picture Experts Group Audio Layer IV), a laptop computer, a desktop computer and the like. In a case that the terminal devices 501, 502, and 503 each are software, the terminal devices 501, 502, and 503 each may be installed in the electronic devices listed above, and may be implemented as multiple software or software modules (for example, software or software modules for providing distributed services), or may be implemented as a single software or software module, which are not limited herein.

The server 505 may provide various services, such as receiving an information acquisition request sent from the terminal devices 501, 502, and 503, acquiring display information corresponding to the information acquisition request in various ways according to the information acquisition request, and sending relevant data of the display information to the terminal devices 501, 502, and 503.

It should be noted that the interaction method according to the embodiments of the present disclosure may be performed by the terminal device, and correspondingly, the interaction apparatus may be arranged in the terminal devices 501, 502 and 503. Alternatively, the interaction method according to the embodiment of the present disclosure may be performed by the server 505, and correspondingly, the interaction apparatus may be arranged in the server 505.

It should be understood that the number of the terminal device, the number of the network and the number of the server in FIG. 5 are only illustrative. The number of the terminal device, the number of the network and the number of the server vary with implementation needs.

Figure 6:
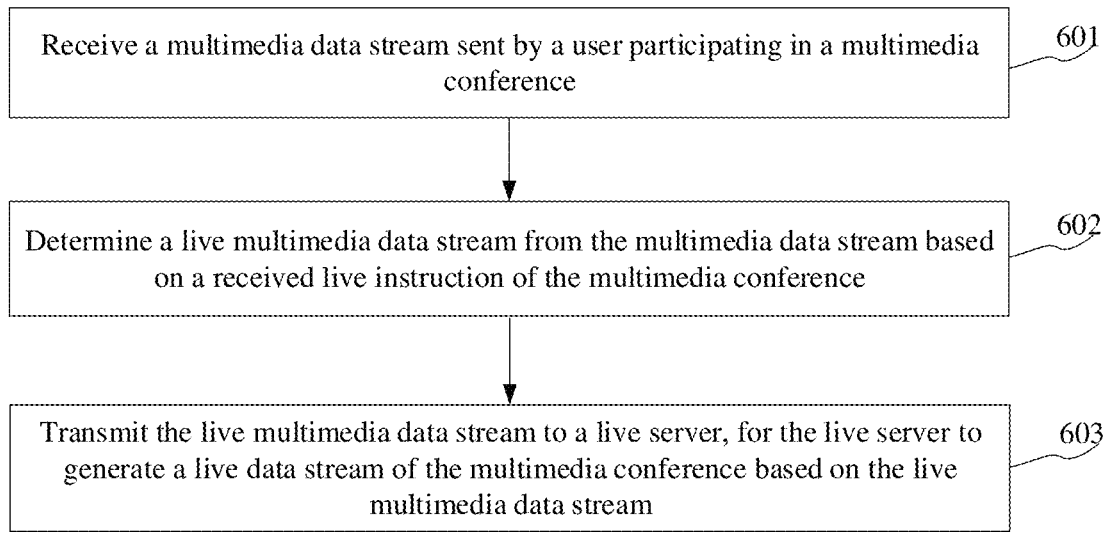
FIG. 6 is a flowchart of an information interaction method according to some embodiments of the present disclosure.

Reference is made to FIG. 6, which is a flowchart of an information interaction method according to some embodiments of the present disclosure. The information interaction method is applied to a multimedia conference server, and includes the following steps 601 to 603.

In step 601, a multimedia data stream sent by a participant of the multimedia conference is received.

In this embodiment, the multimedia conference server may be a single server or a cluster server.

The participant of the multimedia conference is a user who transmits the multimedia data stream to the multimedia conference server and receives a multimedia data stream of another participant from the multimedia conference server.

The multimedia conference here may be an audio conference or a video conference.

Multiple participants may be users with a preset relationship. For example, the multiple participants belong to the same enterprise.

Each participant sends a multimedia data stream to the multimedia conference server by a terminal device (that is, the first terminal device) used by the participant. The multimedia data stream here may include, but is not limited to, an audio data stream and/or a video data stream and the like.

The multimedia conference server further interactively transmits the multimedia data streams of multiple participants. The multimedia data stream of the user here refers to the multimedia data stream received by the multimedia conference server and collected by a multimedia collection device of the first terminal device of the participant. The multimedia collection device here may include an audio collection device (for example, a microphone) and a video collection device (for example, a camera).

In some application scenarios, the multimedia conference server controls the multimedia data stream sent to the participant. For example, the participants of the multimedia conference include A, B, C, and D. The multimedia conference server controls the multimedia data streams of the participants B, C, and D sent to the participant A, the multimedia data streams of the participants A, C, and D sent to the participant B, the multimedia data streams of the participants A, B, and D sent to the participant C, and the multimedia data streams of the participants A, B, and C sent to the participant D. In addition, the multimedia conference server may further sends, according to a request of a participant (for example, the participant A), the multimedia data stream of the participant (for example, the participant A) to another participant (for example, the participant B) specified by the request of the participant; or prohibits sending the multimedia data stream of the participant to another conference participant (for example, the participant B) specified in the request of the participant.

In step 602, a live multimedia data stream is determined from the multimedia data stream based on a received live instruction of the multimedia conference.

The live instruction here may be sent by a preset participant who has the permission to issue a live instruction. A preset participant here may be, for example, a host of the multimedia conference.

The multimedia conference server may determine the live multimedia data stream from the multimedia data stream sent by the participant according to the received live instruction sent by the preset participant.

In some application scenarios, the live instruction is generated based on a live attribute of the multimedia conference set by a multimedia conference applicant when applying for the multimedia conference. For example, the applicant sets an attribute value of the live broadcast of the multimedia conference as characterizing the live broadcast. In a case that the applicant sets the attribute value of the multimedia conference as characterizing the live broadcast, it is equivalent to a live instruction of the multimedia conference to the multimedia conference server. Correspondingly, when starting to receive the multimedia data stream sent by the participant of the multimedia conference, the multimedia conference server starts to generate the live multimedia data stream from the multimedia data stream sent by the participant.

In addition, the preset participant may send a live instruction of the multimedia conference to the multimedia conference server via a second terminal device used by the preset participant when the multimedia conference is started or during the multimedia conference.

The multimedia conference server may determine, in various manners, the live multimedia data stream from the multimedia data stream sent by the participant of the multimedia conference.

For example, the multimedia data stream of each participant is determined as the live multimedia data stream.

Here, the multimedia data stream sent by the participant refers to the multimedia data streams sent by participants to the multimedia conference server through their respective first terminal devices.

In step 603, the live multimedia data stream is transmitted to the live server, so that the live server generates the live data stream of the multimedia conference based on the live multimedia data stream.

The live server here may be a physical electronic device different from the multimedia conference server.

Before sending the live data stream to the live server, the multimedia conference server establishes a communication connection with the live server. The live multimedia data stream sent by the multimedia conference server to the live server may further include a conference identification of the multimedia conference. The conference identification here may include a number, a letter, a symbol and/or a graphic. In some application scenarios, the conference identification may include information of the host of the multimedia conference.

The multimedia conference server may send the live multimedia data stream of the multimedia conference to the live server through the communication connection established with the live server in advance.

The live server may perform various analysis and processing on the live multimedia data stream to generate the live data stream.

In this embodiment, in a case that the live multimedia data stream includes multimedia data streams respectively sent by participants to the multimedia conference server, the live server may combine the multimedia data streams of the participants to generate the live data stream. Further, the live server may push the live data stream to a sharing user with who to be shared with.

Here, in a case that the live multimedia data stream includes an audio data stream, the combing the multimedia data streams of the participants may include, for example, synchronizing waveform data corresponding to audio data streams of the multiple participants according to time, and then superimposing waveforms of the synchronized audio data streams of the multiple participants.

In a case that the live multimedia data stream includes a video data stream, the combing the multimedia data streams of the participants may include selecting a video data stream from the video data streams of the participants as the combined video data stream; or selecting at least two video data streams from the video data streams of the participants and processing the selected video data streams into video data streams that can be displayed on the same display page (video mixing). For example, a page display ratio and a display area of each video data stream to be combined are set. Then, the at least two video data streams for which respective display ratios and display areas are set are integrated into the combined video data stream.

The live multimedia data stream includes the multimedia data streams of the participants, and the live server performs analysis and processing according to the multimedia data streams of the participants to generate the live data stream. Therefore, the step that the multimedia conference server further processes the multimedia data streams of the participants into a live data stream, which is suitable for a multimedia server with limited resources for analyzing and processing the multimedia data stream.

The sharing user may be a user with a preset relationship with the participant. For example, the sharing user is a user belonging to the same enterprise as the participant, or a contact of the participant, and the like. Alternatively, the sharing user may be a user who is not associated with the participant.

With the information interaction method according to this embodiment, the live multimedia data stream is determined based on the multimedia data stream sent by the user participating in the multimedia conference, and the live multimedia data stream is sent to the live server for the live server to live broadcast the live data stream of the multimedia conference, so that a user other than the user participating in the multimedia conference can acquire the content of the multimedia conference by viewing the live data stream of the multimedia conference. In a case of limited multimedia conference server and multi-user-oriented multimedia conference, some users participate in the conference via the multimedia conference server, and other users acquire the content of the multimedia conference in real time via the live server as described above, thereby reducing the load of the multimedia conference server and ensuring the smoothness of the multimedia conference.

In addition, the live server may send information of the sharing user to the multimedia conference server, and the multimedia conference server may send the information of the sharing user to the first terminal device of the participant, so that the participant acquires the information of the sharing user, thereby achieving information interaction between the participant and the sharing user. Since the information of the sharing user does not require real-time transmission of audio and video data, less resources of the multimedia conference server are occupied by the participant to obtain the information of the sharing user. Therefore, the capacity of the multimedia conference server is expanded without increasing the amount of physical resources of the multimedia conference server.

In some optional implementations of this embodiment, the determining the live multimedia data stream from the multimedia data stream in the foregoing step 102 includes: determining the multimedia data streams of some participants as the live multimedia data stream. The step 103 may include transmitting the multimedia data streams of a part of the participants to the live server as the live multimedia data stream, so that the live server combines the multimedia data streams of the part of the participants to generate the live data stream to be sent to the sharing user.

The part of the participants here may be pre-designated participants, such as the host of a multimedia conference, or other designated participant.

In some application scenarios, the part of participants may a participant who speaks within a preset time period at a current moment.

Further, the part of the participants may include some participants whose accumulated audio energy in the preset time period of the current moment of the corresponding audio information is greater than a preset audio energy threshold.

The live server may combine the multimedia data streams of the part of the participants to generate the live data stream of the multimedia conference, for example, combining respective audio data streams of the part of the participants, video mixing the respective video data streams and the like.

The live server may send the live data stream to the second terminal device of the sharing user.

In these optional embodiments, the multimedia conference server selects the multimedia data streams of the part of the participants from the multiple participants as the live multimedia data stream. The live server generates the live data stream based on the live user data stream. The amount of data sent by the multimedia conference server to the live server is relatively small, the load of the multimedia conference server is further reduced while ensuring the information amount of the live data stream as much as possible.

In some optional implementations of this embodiment, determining the live multimedia data stream from the multimedia data stream in the step 102 includes: combining multimedia data streams of at least part of participants to generate a live data stream.

In these optional implementations, the multimedia conference server combines the multimedia data streams of at least part of the participants to generate the live data stream of the multimedia conference. For example, audio data streams of part of the participants are combined, and video data streams of part of the participants are mixed. Alternatively, audio data streams of all the participants are combined, and video data streams of all the participants are mixed.

In these optional implementations, the multimedia conference server generates the live data stream of the multimedia conference, and sends the live data stream to the live server. Before generating the live data stream, the multimedia conference server may compress the multimedia data streams of all the participants, and generate the live data stream based on the compressed multimedia data streams of all the participants. The multimedia conference server generates the live data stream, which can reduce the pressure on the live server with poor data processing capability, so that the live data stream can be played smoothly on the second terminal of the sharing user.

In some optional implementations of this embodiment, the multimedia conference is an audio conference. The live multimedia data stream includes: audio data streams of part of participants.

That is, the live multimedia data stream may consist of audio data streams of all the participants or audio data streams of part of the participants.

In a case that the live multimedia data stream consists of audio data streams of part of the participants, the part of the participants may be users participating in the conference whose accumulated audio energy of the audio data stream within a preset time period is greater than a first preset audio energy threshold.

Alternatively, the part of the participants may be users participating in the conference whose current volume corresponding to the audio data stream is greater than a first preset volume threshold.

Correspondingly, the generating the live data stream based on the live multimedia data stream may include combining the audio data streams of at least part of the participants. The generated live data stream is an audio data stream.

In some optional implementations of this embodiment, the multimedia conference may be a video conference. In these optional implementation manners, the live multimedia data stream includes at least one of: audio data streams of at least part of the participants, a video data stream of a target participant among the participants, and current shared screen information data of the participant of the multimedia conference.

At least part of the participants here may be all the participants. Alternatively, at least part of the participants may include participants whose accumulated audio energy of the audio data stream within a preset time period including the current moment is greater than a preset energy threshold. Alternatively, at least part of the participants may be audio data streams respectively corresponding to all the participants who speak at the current moment.

Further, the target participant includes at least one of: a participant with the largest volume among multiple speaking participants, a participant with the largest accumulated audio energy in the preset time period including the current moment, and a participant with a preset identification.

The participant with a preset identification here may be the host of the multimedia conference, or may be a pre-designated user participating in the conference.

In addition, the target participant may include all the participants.

In some application scenarios, the participant may initiate screen sharing during the video conference.

In these application scenarios, the live user data stream may include audio data streams of at least part of the participants, a video data stream of the target participant, and a data stream of the screen currently shared by the participant.

The data stream of the screen shared by the participant may be obtained, for example, by recording all or part of the content presented on the screen of the first terminal device by the first terminal device of the participant who initiates the screen sharing.

Correspondingly, in the process of generating the live data stream based on the multimedia data stream, the data stream of the shared screen is combined with the video data stream of at least one participant. For example, each frame of screen recording images corresponding to the data stream of the shared screen serves as a result of combining the data stream of the shared screen with the video data stream of the at least one participant. Alternatively, a display parameter such as a display ratio and a display area of the screen recording image of the participant who initiates the screen sharing is set. A display parameter such as a display ratio and a display area of the video frame of the video data stream of the at least one participant is set. Then, the data stream of the shared screen for which the display parameter is set and the video data stream of the at least one participant for which the display parameter is set are packaged into a video file to obtain a combination result.

In some optional implementations of this embodiment, the information interaction method may further include: receiving information of the sharing user sent by the live server, and sending the information of the sharing user to each participant, so that the first terminal device of the participant displays the information of the sharing user.

The live server sends the live data stream to the second terminal device of the sharing user according to a sharing request of the sharing user, and acquires the information of the sharing user.

In these application scenarios, the live server sends the live data stream of the multimedia conference to the second terminal device of the sharing user according to a viewing request of the sharing user, and acquires the information of the sharing user.

In some optional implementations of this embodiment, the information of the sharing user includes information of the number of the sharing user. The receiving information of the sharing user sent by the live server, and sending the information of the sharing user to each participant includes: embedding the information of the number of the sharing user in the interactive multimedia data stream sent to the participant, so that the information of the sharing user is displayed in the first terminal device of the participant. In these optional implementations, the participant of the multimedia conference can obtain the information of the number of the sharing user, so as to know the dissemination scale of the content of the multimedia conference.

In some other optional implementations of this embodiment, the information of the sharing user may further include feedback information of the sharing user. The feedback information here may be generated based on feedback data inputted by the sharing user for the live data stream.

The user feedback information here may include multimedia information and/or text information.

In some application scenarios, the sharing user inputs text content of the live data stream through the second terminal device used by the sharing user, and the text information fed back by the sharing user is generated based on the text content inputted by the sharing user.

In these application scenarios, the live server sends the text information of the sharing user to the multimedia conference server.

In these application scenarios, the user inputs text feedback information of the live data stream. In the process of the live server transmitting the text information to the multimedia conference server, and the process of the multimedia conference server sending the text information to the participant, the amount of data transmitted is small, and less data transmission resources are utilized, which is conducive to smoothness of the multimedia conference and the live stream.

In some other application scenarios, the sharing user inputs multimedia information for feedback on the live data stream through the second terminal device used by the sharing user. The multimedia information fed back by the user serves as the feedback information of the sharing user. The multimedia information here may include audio information and/or image information.

In these application scenarios, the live server sends the multimedia information fed back by the user to the multimedia conference server, so that the multimedia conference server sends the multimedia information fed back by the sharing user to the first terminal device of the participant.

In these application scenarios, the sharing user inputs the multimedia information fed back by the sharing user, thereby improving the convenience of sharing the user feedback information inputted by the sharing user.

In some other application scenarios, the sharing user inputs the multimedia information fed back by the sharing user on the live data stream through the second terminal device used by the sharing user. The live server recognizes the multimedia information, and obtains text information corresponding to the multimedia information. The recognition includes speech recognition and/or image recognition. The live server sends the text information corresponding to the multimedia information to the multimedia conference server.

In these application scenarios, on the one hand, the convenience of sharing the user feedback information input by the sharing user can be improved. On the other hand, in the process of the live server transmitting the text information to the multimedia conference server, and the process of the multimedia conference server sending the text information to the participant, the amount of data transmitted is small, and less data transmission resources are utilized, which is conducive to smoothness of the multimedia conference and the live stream.

In some other application scenarios, the sharing user inputs the multimedia information of the feedback of the live data stream through the second terminal device used by the sharing user. The live server performs speech recognition on the multimedia information to obtain text information corresponding to the multimedia information. The live server sends the text information corresponding to the multimedia information and the multimedia information to the multimedia conference server.

In these application scenarios, the multimedia conference server sends the multimedia information and the text information to the first terminal device of the participant, so that the participant acquires the feedback information from the sharing user in a convenient way (playing the multimedia information, or browsing the text information).

In some other application scenarios, the user feedback information also includes a video screenshot of a live data stream segment corresponding to the user feedback information, and the video screenshot is captured by the sharing user.

In these application scenarios, the video screenshot may include a shared screen of the participant. That is, in a case that the live data stream includes the information of the shared screen data stream, If the sharing user has user feedback information on the content in the shared screen, the sharing user captures a screenshot of a video frame corresponding to the shared screen, and sends the captured video frame and the audio information and/or text information recording the user feedback content to the live server.

In some optional implementations of this embodiment, the receiving the information of the sharing user sent by the live server so that the information of the sharing user is presented on the first terminal device of each participant includes: sending the information of the sharing user to the participant, so that the first terminal device of the participant displays the information of the sharing user as at least one of: a floating window, a pop-up window, a preset window area of the multimedia conference, and a bullet chat.

The preset window area of the multimedia conference here may be a pre-determined partial area for displaying the display interface of the multimedia conference.

Figure 7:
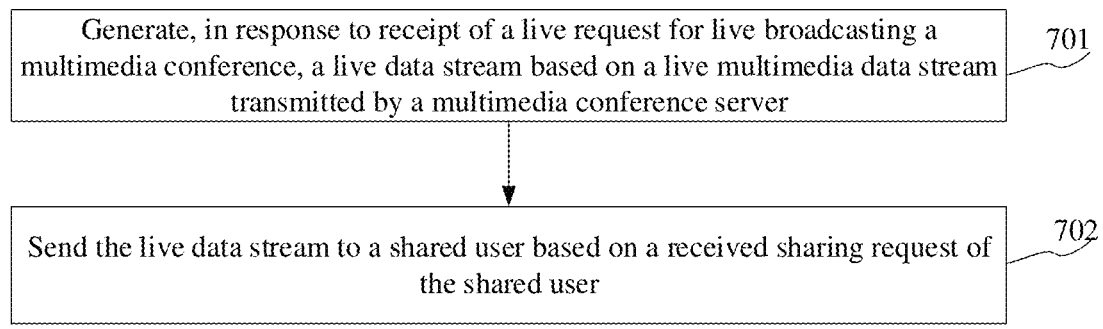
FIG. 7 is a flowchart of an information interaction method according to some embodiments of the present disclosure.

Reference is made to FIG. 7, which is a flowchart of an information interaction method according to some embodiments of the present disclosure. The information interaction method is applied to a live server for transmitting a live data stream of a multimedia conference, and includes the following steps 701 to 702.

In step 701, in response to receipt of a live request for live broadcasting the multimedia conference, a live data stream is generated based on a live multimedia data stream transmitted by a multimedia conference server.

The live multimedia data stream is determined by the multimedia conference server based on the received live instruction of the multimedia conference and from the received multimedia data stream sent by the participant of the multimedia conference.

For the process of determining the live multimedia data stream by the multimedia conference server from the received multimedia data stream sent by the participant of the multimedia conference, reference is made to the description of the relevant part of the embodiment shown in FIG. 1, which is not be repeated here.

In step 702, the live data stream is sent to the sharing user according to the received sharing request of the sharing user.

The live request here may be sent by the multimedia conference server to the live server through a pre-generated communication connection.

In this embodiment, the live server generates the live data stream based on the live user data stream sent by the multimedia conference server, and sends the live data stream to the sharing user other than the participant. In a case of limited multimedia conference server and multi-user-oriented multimedia conference, some users participate in the conference via the multimedia conference server, and other users acquire the content of the multimedia conference in real time via the live server as described above, thereby reducing the load of the multimedia conference server and ensuring the smoothness of the multimedia conference.

In some optional implementations of this embodiment, the live multimedia data stream is a multimedia data stream of the participant. The multimedia data stream of the participant here may consist of multimedia data streams sent by all the participants through their respective first terminal devices, or multimedia data streams sent by part of the participants through their respective first terminal devices.

Further optionally, the live multimedia data stream includes at least one of: audio data streams of at least part of the participants, a video data stream of a target participant among the participants, and a current shared screen information data of the participant of the multimedia conference.

Further optionally, the live multimedia data stream consists of audio data streams of part of the participants. The accumulated audio energy of the audio data streams of the part of the participants within a preset time period is greater than a first preset audio energy threshold. Alternatively, the respective volumes of the audio data streams of the part of the participants are greater than a first preset volume threshold.

Further optionally, the target participant includes at least one of: a participant with the largest volume among multiple speaking participants, a participant with the largest accumulated audio energy in the preset time period including the current moment as a current target participant, and a participant with a preset identification.

In some optional implementations of this embodiment, before sending the live data stream to the second terminal device of the sharing user according to the received sharing request of the sharing user, the information interaction method further includes the following steps.

First, a sharing portal for sharing a live data stream and corresponding to a live channel is generated. The live channel includes viewing the live data stream through a multimedia conference application and viewing the live data stream through a webpage. The viewing portal includes a link to view the live data stream, a card that includes information of the link, or a code that includes information of the link.

The live server determines a playing channel corresponding to the live data stream. The playing channel here includes, for example, viewing through a video playing application, viewing through a webpage, viewing through a live application, and the like. Then, the viewing portal for viewing the live data stream and corresponding to the back channel is generated.

In some application scenarios, the playing channel may be viewing through a webpage. For example, the viewing portal corresponding to the viewing channel of viewing through the webpage may be a playing network address embedded in a preset webpage. The playing network address is a network address where a live stream is provided to the user. The preset webpage here may be any webpage. In some application scenarios, the preset webpage may have a preset relationship with the participant of the preset multimedia conference.

The code that includes information of the link may be a barcode, a two-dimensional code, or in other forms.

The sharing user may be a user with a preset relationship with the participant. For example, the sharing user is a user who belongs to the same enterprise as the participant. Alternatively, the sharing user is a contact of the participant.

Next, the viewing portal is distributed.

The live server may distribute the viewing portal to the preset contact. For example, the viewing portal is sent to an instant messaging application of the preset contact. In another example, the viewing portal is bound to a preset webpage.

In some optional implementations of this embodiment, the sending the live data stream to the sharing user according to the received sharing request of the sharing user includes the following steps.

Firstly, it is determined based on identification information of the sharing user carried in the sharing request whether the sharing user has permission to view the live data stream.

After receiving the sharing request from the sharing user, the live server authenticates the identification information of the sharing user in various manners, to determine whether the sharing user has the permission to view the live data stream.

In some application scenarios, a whitelist may be preset. The preset whitelist may include identification information respectively corresponding to multiple sharing users who have the permission to share the live data stream. The determining based on the identification information of the sharing user carried in the sharing request whether the sharing user has the permission to view the live data stream includes: matching the identification information of the sharing user with the preset whitelist; and determining based on the matching result whether the sharing user has the permission to view the live data.

In a case that the matching is successful, it is determined that the sharing user has the permission to view the live data stream. Otherwise, it is determined that the sharing user has no permission to view the live data stream.

Secondly, in response to determination that the sharing user has permission to view the live data stream, the live data stream is sent to the second terminal device of the sharing user.

In these optional implementations, whether the sharing user has permission is determined before the live data stream is sent to the sharing user, thereby avoiding unnecessary leakage of information of the multimedia conference.

In some optional implementations of this embodiment, the information interaction method further includes: acquiring the information of the sharing user; and sending the information of the sharing user to the multimedia conference server, so that the multimedia conference server sends the information of the sharing user to the first terminal device of the participant.

Further optionally, the information of the sharing user includes the number of the sharing user and/or feedback information of the sharing user.

Further optionally, the information of the sharing user includes the number of the sharing user. The acquiring the information of the sharing user includes: determining the number of the sharing user based on the viewing requests respectively sent by multiple sharing users.

In some optional implementations of this embodiment, the information of the sharing user includes the feedback information of the sharing user. The acquiring the information of the sharing user includes: receiving a feedback request from the sharing user, and determining whether the sharing user has permission for information feedback; and receiving user feedback information sent by the sharing user in response to determination that the sharing user has permission for information feedback.

In these optional implementations, permission is set for a user who feeds back information, so as to avoid network congestion caused by an excessively large amount of feedback information data in a short period of time.

In some optional implementations of this embodiment, the user feedback information includes multimedia information and/or text information. The sending the information of the sharing user to the multimedia conference server includes: sending the multimedia information and/or text information to the multimedia conference server.

In some optional implementations of this embodiment, the user feedback information includes multimedia information. Before sending the information of the sharing user to the multimedia conference server, the method further includes: recognizing the multimedia information fed back by the sharing user to obtain text information corresponding to the multimedia information. The recognition of multimedia information here includes speech recognition, image recognition, and the like.

The sending the information of the sharing user to the multimedia conference server includes: sending the text information corresponding to the multimedia information fed back by the sharing user to the multimedia conference server.

The text information corresponding to the multimedia information is sent to the multimedia conference server, thereby reducing the amount of data transmission and saving the resources of video multimedia.

Figure 8:
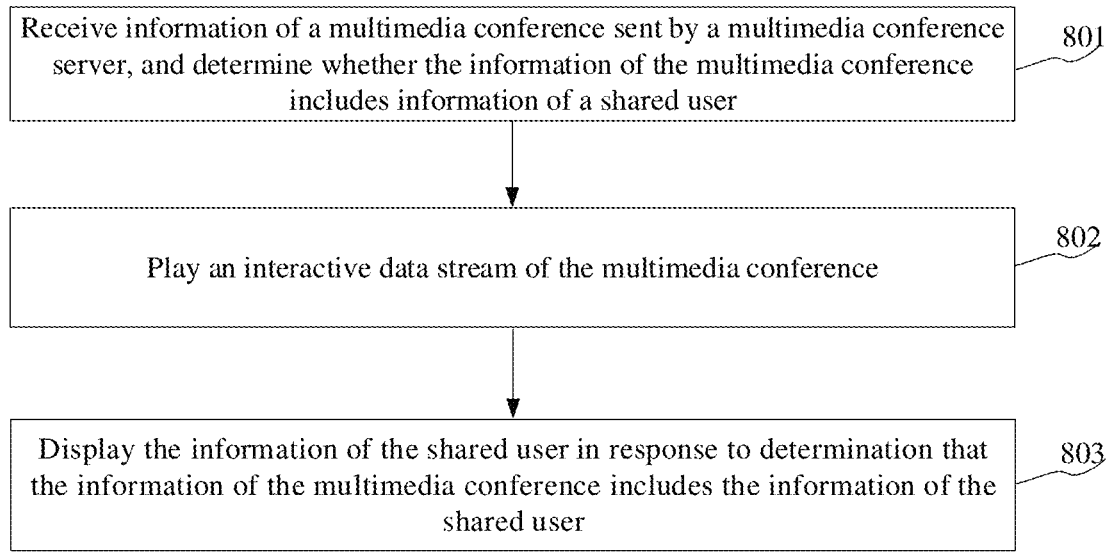
FIG. 8 is a flowchart of an information interaction method according to some embodiments of the present disclosure.

Reference is made to FIG. 8, which is a flowchart of an information interaction method according to some embodiments of the present disclosure. The information interaction method is applied to a first terminal device of a user participating in a multimedia conference, and includes the following steps 801 to 803.

In step 801, information of the multimedia conference sent by a multimedia conference server is received, and it is determined whether the information of the multimedia conference includes information of a sharing user.

In step 802, interactive data stream of the multimedia conference is played.

In step 803, the information of the sharing user is presented in response to determination that the information of the multimedia conference includes the information of the sharing user.

The first terminal device here may include a mobile terminal such as a mobile phone, a notebook computer, a digital broadcast receiver, a PDA (personal digital assistant), a PAD (tablet computer), a vehicle-mounted terminal (such as a vehicle-mounted navigation terminal) and a stationary terminal device such as a digital TV, and a desktop computer.

The information of the multimedia conference includes the interactive data stream of the multimedia conference.

The information of the sharing user is sent by a live server and is information of the sharing user sharing a live data stream corresponding to the multimedia conference. The live data stream is generated by the live server based on a live multimedia data stream sent by the multimedia conference server. The live multimedia data stream is determined by the multimedia conference server from the received multimedia data stream sent by the participant of the multimedia conference according to a received live instruction of the multimedia conference. For the generation of the live data stream, reference can be made to the description of the embodiments shown in FIG. 6 and FIG. 7, and details are not described here.

In some optional implementations, the information of the sharing user includes number information of the sharing user and/or feedback information of the sharing user.

In some optional implementations, the user feedback information includes: multimedia information and/or text information.

The playing the interactive data stream of the multimedia conference may include decoding and displaying the interactive data stream of the multimedia conference.

In some optional implementations, the information of the sharing user is presented as at least one of: a floating window, a pop-up window, a preset area of a display window of the multimedia conference, and a bullet chat.

In this embodiment, the information of the multimedia conference is recognized by the first terminal device of the participant, and it is determined whether the information of the multimedia conference includes the information of the sharing user sent by the live server. If it is determined that the information of the multimedia conference includes the information of the sharing user, the information of the sharing user is presented when the multimedia data sent by the multimedia conference server is displayed. Therefore, the participant can know the information of the sharing user while reducing the load of the multimedia conference server. Further, the interaction between the participant and the sharing user is realized to a certain extent. Therefore, the capacity of the multimedia conference server is expanded based on the existing resources of the multimedia conference server.

Figure 9:
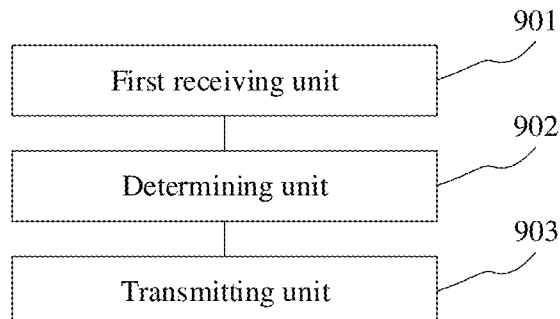
FIG. 9 is a schematic structural diagram of an information interaction apparatus according to some embodiments of the present disclosure.

Reference is made to FIG. 9, which shows an information interaction apparatus according to some embodiments of the present disclosure, as an implementation of the method shown in FIG. 1. These apparatus embodiments correspond to those method embodiments shown in FIG. 1, and the apparatus may be applied to various electronic devices.

As shown in FIG. 9, the information interaction apparatus according to some embodiments includes: a first receiving unit 901, a determining unit 902, and a transmitting unit 903. The first receiving unit 901 is configured to receive a multimedia data stream sent by a user participating in a multimedia conference. The determining unit 902 is configured to determine a live multimedia data stream from the multimedia data stream based on a received live instruction of the multimedia conference. The transmitting unit 903 is configured to transmit the live multimedia data stream to a live server, so that the live server generates a live data stream of the multimedia conference based on the live multimedia data stream.

In this embodiment, the processing of the first receiving unit 901, the determining unit 902, and the transmitting unit 903 of the information interaction apparatus and the technical effects brought about by the processing of the first receiving unit 901, the determining unit 902, and the transmitting unit 903 of the information interaction apparatus may refer to steps 101, 102, and 103 in the embodiment shown in FIG. 1, respectively. Details are not repeated here.

In an optional implementation of some embodiments, the live multimedia data stream includes a multimedia data stream of a participant. The transmitting unit 903 is further configured to: send the multimedia data stream of the participant to the live server, so that the live server combines the received multimedia data streams of participant users to generate the live data stream.

In an optional implementation of some embodiments, the determining unit 902 is further configured to: combine multimedia data streams of at least part of the participants to generate the live multimedia data stream.

In an optional implementation of some embodiments, the live multimedia data stream includes at least one of: audio data streams of at least part of the participants, a video data stream of a target participant among the participants, and current shared screen information data of the participant of the multimedia conference.

In an optional implementation of some embodiments, the live multimedia data stream includes audio data streams of part of the participants. The accumulated audio energy of the audio data streams of the part of the participants within a preset time period is greater than a first preset audio energy threshold. Alternatively, respective volumes of the audio data streams of the part of the participants are greater than a first preset volume threshold.

In an optional implementation of some embodiments, the target participant includes at least one of: a participant with the largest volume among multiple speaking participants, a participant with the largest accumulated audio energy in the preset time period including the current moment, and a participant with a preset identification.

In an optional implementation of some embodiments, the information interaction apparatus further includes: a receiving unit (not shown in the drawings). The receiving unit is configured to receive the information of the sharing user sent by the live server, so that the information of the sharing user is presented on the first terminal device of each participant. The live server distributes the live data stream to the second terminal device of the sharing user according to a sharing request of the sharing user, and acquires the information of the sharing user.

In an optional implementation of some embodiments, the information of the sharing user includes number information of the sharing user and/or feedback information of the sharing user.

In an optional implementation of some embodiments, the feedback information includes multimedia information and/or text information.

In an optional implementation of some embodiments, the text information includes text information obtained by the live server recognizing the multimedia information.

In an optional implementation of some embodiments, the user feedback information includes a video screenshot of a live data stream segment corresponding to the user feedback information, and the video screenshot is captured by the sharing user.

In an optional implementation of some embodiments, the receiving unit is further configured to: send the information of the sharing user to each participant, so that the first terminal device of the participant presents the information of the sharing user as at least one of: a floating window, a pop-up window, a preset window area of the multimedia conference, and a bullet chat.

With the information interaction apparatus according to this embodiment, the live multimedia data stream is determined based on the multimedia data stream sent by the user participating in the multimedia conference, and the live multimedia data stream is sent to the live server for the live server to live broadcast the live data stream of the multimedia conference, so that a user other than the user participating in the multimedia conference can acquire the content of the multimedia conference by viewing the live data stream of the multimedia conference. In a case of limited multimedia conference server and multi-user-oriented multimedia conference, some users participate in the conference via the multimedia conference server, and other users acquire the content of the multimedia conference in real time via the live server as described above, thereby reducing the load of the multimedia conference server and ensuring the smoothness of the multimedia conference.

Figure 10:
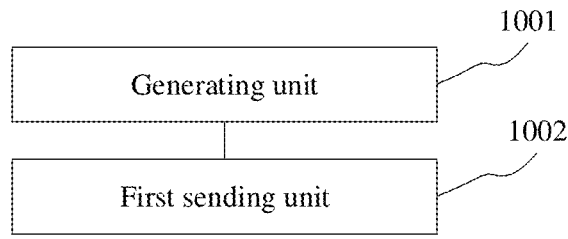
FIG. 10 is a schematic structural diagram of an information interaction apparatus according to some embodiments of the present disclosure.

Reference is made to FIG. 10, which shows an information interaction apparatus according to some embodiments of the present disclosure, as an implementation of the method shown in FIG. 7. These apparatus embodiments correspond to the method embodiments shown in FIG. 2, and the apparatus may be applied in various electronic devices.

As shown in FIG. 10, the information interaction apparatus according to some embodiments includes: a generating unit 1001 and a first sending unit 1002. The generating unit 1001 is configured to: in response to receipt a live request for live broadcast of the multimedia conference, generate a live data stream based on a live multimedia data stream sent by the multimedia conference server. The first sending unit 1002 is configured to: send the live data stream to a sharing user according to a received sharing request from the sharing user. The live multimedia data stream is determined by the multimedia conference server based on a received live instruction of the multimedia conference from a received multimedia data stream sent by a user participating in the multimedia conference.

In this embodiment, the processing of the generating unit 1001 and the first sending unit 1002 of the information interaction apparatus and the technical effects brought about by the generating unit 1001 and the first sending unit 1002 of the information interaction apparatus may refer to the relevant descriptions of the steps 1001 and 1002 in the embodiment shown in FIG. 2, and details are not described here.

In an optional implementation of some embodiments, the live multimedia data stream is a multimedia data stream of a participant. The generating unit 1001 is further configured to: combine the multimedia data streams of multiple participants to generate a live data stream that is to be sent to the sharing user.

In an optional implementation of some embodiments, the live multimedia data stream includes at least one of: audio data streams of at least part of the participants, a video data stream of a target participant among the participants, and current shared screen information data of the participant of the multimedia conference.

In an optional implementation of some embodiments, the live multimedia data stream includes audio data streams of part of the participants. The accumulated audio energy of the audio data streams of the part of the participants within a preset time period is greater than a first preset audio energy threshold. Alternatively, respective volumes of the audio data streams of the part of the participants are greater than a first preset volume threshold.

In an optional implementation of some embodiments, the target participant includes at least one of: a participant with the largest volume among multiple speaking participants, a participant with the largest accumulated audio energy in the preset time period including the current moment, and a participant with a preset identification.

In an optional implementation of some embodiments, the information interaction apparatus further includes: a distribution unit (not shown in the drawings). The distributing unit is configured to: generate a sharing portal for sharing a live data stream and corresponding to a live channel, wherein the live channel includes viewing the live data stream through a multimedia conference application and viewing the live data stream through a webpage, and the viewing portal includes a link to view the live data stream, a card that includes information of the link, or a code that includes information of the link; and distribute the viewing portal.

In an optional implementation of some embodiments, the first sending unit 1002 is further configured to: determine based on the identification information of the sharing user carried in the sharing request whether the sharing user has permission to view the live data stream; and send the live data stream to the second terminal device of the sharing user in response to determination that the sharing user has permission to view the live data stream.

In an optional implementation of some embodiments, the first sending unit 1002 is further configured to: match the identification information of the sharing user with a preset whitelist; and determine based on the matching result whether the sharing user has permission to view the live data. The whitelist includes the identification information of multiple users who have permission to share the live data stream.

In an optional implementation of some embodiments, the information interaction apparatus further includes: a second sending unit (not shown in the drawings). The second sending unit configured to: acquire the information of the sharing user; and send the information of the sharing user to the multimedia conference server, so that the multimedia conference server sends the information of the sharing user to the first terminal device of each participant.

In an optional implementation of some embodiments, the information of the sharing user includes the number of the sharing user and/or feedback information of the sharing user.

In an optional implementation of some embodiments, the feedback information includes multimedia information and/or text information.

In an optional implementation of some embodiments, the text information includes text information obtained by the live server recognizing the multimedia information.

Figure 11:
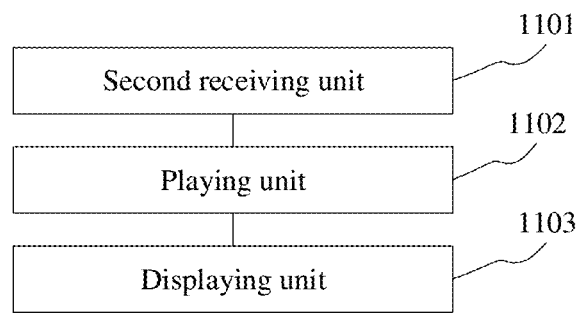
FIG. 11 is a schematic structural diagram of an information interaction apparatus according to some embodiments of the present disclosure.

Reference is made to FIG. 11, which shows an information interaction apparatus according to some embodiments of the present disclosure, as an implementation of the method shown in FIG. 8. These apparatus embodiments correspond to the method embodiments shown in FIG. 3, and the apparatus may be applied in various electronic devices.

As shown in FIG. 11, the information interaction apparatus includes: a second receiving unit 1101, a playing unit 1102 and a displaying unit 1103. The second receiving unit 1101 is configured to receive information of a multimedia conference sent by a multimedia conference server, and determine whether the information of the multimedia conference includes information of a sharing user. The information of the multimedia conference includes an interactive data stream of the multimedia conference. The information of the sharing user is sent by a live server and is information of a user sharing the live data stream corresponding to the multimedia conference. The playing unit 1102 is configured to play the interactive data stream of the multimedia conference. The displaying unit 1103 is configured to display the information of the sharing user in response to determination that the information of the multimedia conference includes the information of the sharing user. The live data stream is generated by the live server based on the live multimedia data stream sent by the multimedia conference server. The live multimedia data stream is determined by the multimedia conference server based on a received live instruction of the multimedia conference from a received multimedia data stream sent by a user participating in the multimedia conference.

In this embodiment, the processing of the second receiving unit 1101, the playing unit 1102 and the displaying unit 1103 of the information interaction apparatus and the technical effects brought about by the processing of the second receiving unit 1101, the playing unit 1102 and the displaying unit 1103 of the information interaction apparatus can refer to steps 801, 802 and 802 in the embodiment of FIG. 8, respectively. Details are not repeated here.

In an optional implementation of some embodiments, the information of the sharing user includes number information of the sharing user and/or feedback information of the sharing user.

In an optional implementation of some embodiments, the user feedback information includes multimedia information and/or text information.

In an optional implementation of some embodiments, the displaying unit 1103 displaying the information of the sharing user as at least one of: a floating window, a pop-up window, a preset area of a display window the multimedia conference, and a bullet chat.

Figure 12:
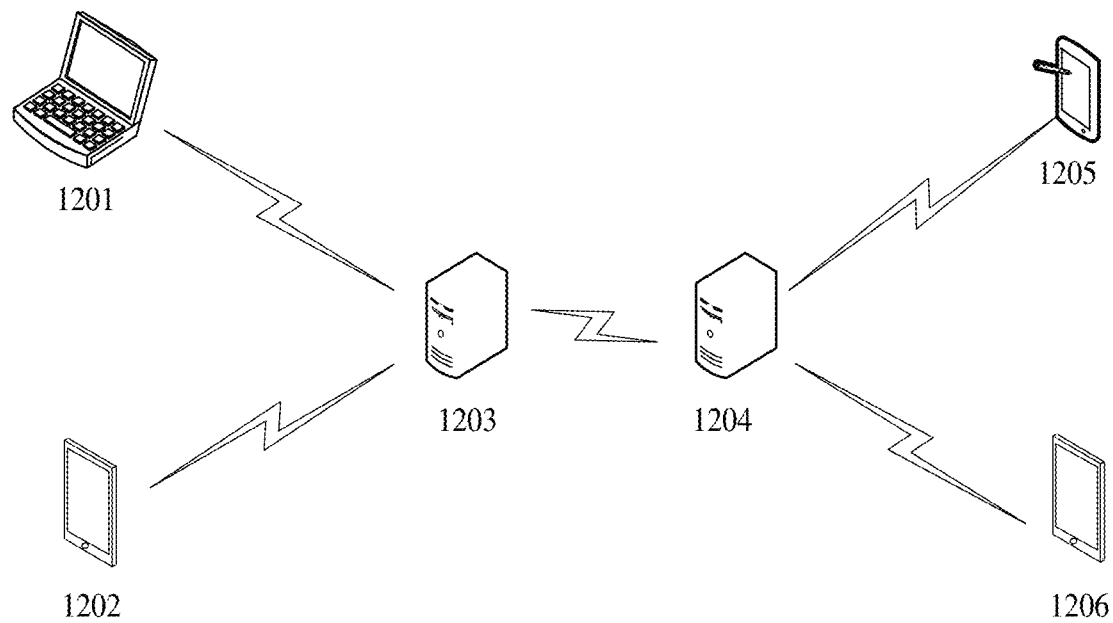
FIG. 12 is an architectural diagram of an information interaction system according to some embodiments of the present disclosure.

Reference is made to FIG. 12, which illustrates a system architecture of the information interaction method or information interaction apparatus to which some embodiments of the present disclosure may be applied.

As shown in FIG. 12, the system architecture includes first terminal devices 1201 and 1202, a multimedia conference server 1203, a live server 1204, and second terminal devices 1205 and 1206. The first terminal devices 1201 and 1202 are in communication with the multimedia conference server 1203 over network, the multimedia conference server 1203 is connected in communication with the live server 1204 over network, and the live server 1204 is connected in communication with the second terminal devices 1205 and 1206 over network. The network may be in various connection types, such as wired, wireless communication link, or fiber optic cable.

The user uses the first terminal devices 1201 and 1202 to interact with the multimedia conference server 1203 via the network to receive or send messages and the like. Various communication client applications, such as instant messaging applications and conference servers, may be installed on the first terminal devices 1201 and 1202.

The user uses the second terminal devices 1205 and 1206 to interact with the live server 1204 via the network to receive or send messages and the like. Various communication client applications such as instant messaging applications, conference servers, and web clients may be installed on the second terminal devices 1205 and 1206.

The multimedia conference server 1203 is configured to: receive multimedia data stream sent by a user participating in the multimedia conference through the first terminal devices 1201 and 1202; determine a live multimedia data stream from the multimedia data stream based on a received live instruction of the multimedia conference; transmit the live multimedia data stream to the live server, so that the live server generates a live data stream of the multimedia conference based on the live multimedia data stream; and receive information of a sharing user sent by the live server, and send the information of the sharing user to the first terminal devices of the user participating in the multimedia conference. The multimedia conference server may perform various steps of the method according to the embodiment shown in FIG. 1.

The first terminal devices 1201 and 1202 of the user participating in the multimedia conference each are configured to receive multimedia information sent by the multimedia conference server, and play an interactive data stream of the multimedia conference included in the multimedia information, and display information of the sharing user who shares the live data stream, and the information of the sharing user is included in the multimedia information. The first terminal devices each may perform various steps of the method according to the embodiment shown in FIG. 3.

The live server 1204 is configured to: in response to receipt of a live request for broadcasting the multimedia live conference, generate a live data stream based on the live multimedia data stream sent by the multimedia conference server; and send the live data stream to the second terminal devices 1205 and 1206 of the sharing user based on a received sharing request from the sharing user. The live server may perform various steps of the method according to the embodiment shown in FIG. 2.

The second terminal devices 1205 and 1206 each are configured to: receive the live data stream sent by the live server 1204 based on the sharing request of the sharing user, and play the live data stream; and receive user feedback information inputted by the sharing user.

The first terminal devices 1201 and 1202 and the second terminal devices 1205 and 1206 each may be hardware or software. In a case of hardware, the first terminal devices 1201 and 1202 and the second terminal devices 1205 and 1206 each include various electronic devices with a display screen and supporting information display, including but not limited to a smart phone, a tablet computer, an e-book reader, a laptop computer, a desktop computer and the like. In a case of software, the first terminal devices 1201 and 1202 and the second terminal devices 1205 and 1206 each include may be installed in the electronic devices listed above, and may be implemented as multiple software or software modules, for example, for providing distributed services, or may be implemented as a single software or software module, which are not limited herein.

It should be noted that, the information interaction method according to the embodiment of the present disclosure may be performed by the multimedia conference server 1203, the live server 1204, or the first terminal device. Correspondingly, the information interaction apparatus may be provided in the multimedia conference server 1203, the live server 1204, or the first terminal devices 1201 and 1202.

It should be noted that the server may be hardware or software. In a case of hardware, the server may be implemented as a distributed server cluster including multiple servers, or as a single server. In a case of software, the server may be implemented as multiple software or software modules, for example, for providing distributed services, or may be implemented as a single software or software module, which are not limited herein.

It should be understood that the number of the first terminal device, the number of the second terminal device, the number of the multimedia conference server and the number of the live server in FIG. 12 are only illustrative. The number of the first terminal device, the number of the second terminal device, the number of the multimedia conference server and the number of the live server vary with implementation needs.

Figure 13:
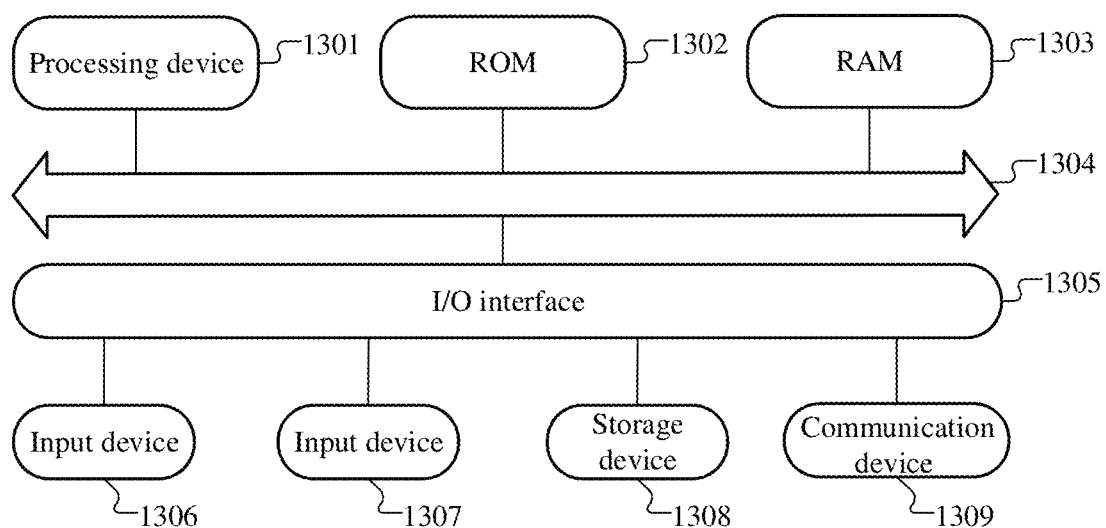
FIG. 13 is a schematic structural diagram of an electronic device for implementing some embodiments of the present disclosure.

Reference is made to FIG. 13 below, which is a schematic structural diagram of an electronic device (for example, the server or terminal device in FIG. 8) for implementing some embodiments of the present disclosure. The terminal device according to some embodiments of the present disclosure may include, but is not limited to, a mobile terminal such as a mobile phone, a notebook computer, a digital broadcast receiver, a PDA (personal digital assistant), a PAD (tablet computer), a PMP (portable multimedia player), and a vehicle-mounted terminal (such as a vehicle-mounted navigation terminal) and a stationary terminal device such as a digital TV, and a desktop computer.

As shown in FIG. 13, the electronic device includes a processing device (for example, a central processing unit, or a graphics processing unit) 1301. The processing device may perform various appropriate operations and processing according to a program stored in a read only memory (ROM) 1302 or a program loaded from a storage device 13013 into a random-access memory (RAM) 1303. In the RAM 1303, various programs and data necessary for the operation of the electronic device are also stored. The processing device 1301, the ROM 1302, and the RAM 1303 are connected to each other through a bus 1304. An input/output (I/O) interface 1305 is also connected to the bus 1304.

Generally, the following devices are connected to the I/O interface 1305: an input device 1306 including, for example, a touch screen, a touch pad, a keyboard, a mouse, a camera, a microphone, an accelerometer, and a gyroscope; an output device 1307 including, for example, a liquid crystal display (LCD), a speaker, and a vibrator; a storage device 1308 including, for example, a tape, a hard disk, and a memory card; and a communication device 1309. The communication means 1309 allows the electronic device to communicate with other devices wirelessly or in wired to exchange data. Although FIG. 13 illustrates an electronic device having various devices, it should be understood that not all of the illustrated devices are implemented or available. More or fewer devices may alternatively be implemented or provided. Each block shown in FIG. 13 represents one device, and may represent multiple devices as needed.

In particular, according to some embodiments of the present disclosure, the processes described above with reference to the flowcharts may be implemented as a computer software program. For example, a computer program product is provided according to some embodiments of the present disclosure. The computer program product includes a computer program carried on a computer-readable medium, the computer program containing program code for performing the method illustrated in the flowchart. In some such embodiments, the computer program may be downloaded and installed from the network via the communication device 1309, or from the storage device 13013, or from the ROM 1302. When the computer program is executed by the processing device 1301, the functions defined in the methods of some embodiments of the present disclosure are performed.

It should be noted that the computer-readable medium according to some embodiments of the present disclosure may be a computer-readable signal medium or a computer-readable storage medium, or any combination of the computer-readable signal medium and the computer-readable storage medium. The computer-readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connection with one or more wires, a portable computer disk, a hard disks, random access memory (RAM), read only memory (ROM), erasable programmable read only memory (EPROM or flash memory), an optical fiber, a portable compact disk read only memory (CD-ROM), an optical storage devices, a magnetic storage device, or any suitable combination of the above. In some embodiments of the present disclosure, the computer-readable storage medium may be any tangible medium that contains or stores a program that may be used by or in conjunction with an instruction execution system, apparatus, or device. In some embodiments of the present disclosure, a computer readable signal medium may include a data signal propagated in a baseband or as part of a carrier wave with computer readable program code embodied thereon. Such propagated data signal may be in a variety of forms, including but not limited to an electromagnetic signal, an optical signal, or any suitable combination of the foregoing. The computer-readable signal medium may be any computer-readable medium other than the computer-readable storage medium. The computer-readable signal medium can transmit, propagate, or transport the program that is used by or in connection with the instruction execution system, apparatus, or device. The program code embodied on the computer readable medium may be transmitted via suitable medium including, but not limited to, an electrical wire, an optical fiber cable, RF (radio frequency) and the like, or any suitable combination of the foregoing.

In some embodiments, the client and the server may perform communication based on any currently known or future developed network protocol such as HTTP (Hyper Text Transfer Protocol), and may be interconnected with any form or medium of digital data communication (for example, a communication network). Examples of the communication network include a local area network ("LAN"), a wide area network ("WAN"), a global network (for example, the Internet), and a peer-to-peer network (for example, ad hoc peer-to-peer network), as well as any currently known or future development network.

The computer-readable medium may be included in the electronic device, or may exist alone without being assembled into the electronic device. The computer-readable medium carries one or more programs, and when the one or more programs are executed by the electronic device, the electronic device: send a multimedia conference starting request to a server in response to detection of a triggering operation on a multimedia conference control, where the server starts a multimedia conference in response to determination of starting the multimedia conference based on the multimedia conference starting request; and send conference live confirmation information to the server in response to detection of a confirmation operation on a conference live confirmation control, where in response to receipt of the conference live confirmation information by the server and in response to receipt of a multimedia conference stream, a live stream is generated based on the received multimedia conference stream, and where the multimedia conference stream is sent to the server by participants of the multimedia conference.

The computer-readable medium may be included in the electronic device, or may exist alone without being assembled into the electronic device. The computer-readable medium carries one or more programs, and when the one or more programs are executed by the electronic device, the electronic device: receive a live stream acquisition request; and determine whether to return a live stream based on the live stream acquisition request.

The computer-readable medium may be included in the electronic device, or may exist alone without being assembled into the electronic device. The computer-readable medium carries one or more programs, and when the one or more programs are executed by the electronic device, the electronic device: receive a multimedia data stream sent by the user participating in the multimedia conference; determine a live multimedia data stream from the multimedia data stream according to a received live instruction of the multimedia conference; transmit the live multimedia data stream to the live server, so that the live server generates a live data stream of the multimedia conference based on the live multimedia data stream. Alternatively, the electronic device: in response to receipt of a live request for broadcasting the multimedia live conference, generate a live data stream based on the live multimedia data stream sent by the multimedia conference server; and send the live data stream to the sharing user based on a received sharing request from the sharing user. The live multimedia data stream is determined by the multimedia conference server based on a received live instruction of the multimedia conference from a received multimedia data stream sent by the user participating in the multimedia conference. Alternatively, the electronic device: receive information of the multimedia conference sent by the multimedia conference server, and determine whether the information of the multimedia conference includes information of a sharing user, where the information of the multimedia conference includes an interactive data stream of the multimedia conference, and the information of the sharing user is sent by the live server and is information of a user sharing the live data stream corresponding to the multimedia conference; play the interactive data stream of the multimedia conference; and display the information of the sharing user in response to determination that the information of the multimedia conference includes the information of the sharing user. The live data stream is generated by the live server based on the live multimedia data stream sent by the multimedia conference server. The live multimedia data stream is determined by the multimedia conference server based on a received live instruction of the multimedia conference from a received multimedia data stream sent by a user participating in the multimedia conference.

The computer program code for implementing operations of some embodiments of the present disclosure may be written in one or more programming languages, or a combination thereof. The programming languages include object-oriented programming languages such as Java, Smalltalk, C++, and conventional procedural programming languages such as the "C" language or similar programming languages. The program code may be executed entirely on a user computer, partly on a user computer, as a stand-alone software package, partly on a user computer and partly on a remote computer, or entirely on a remote computer or server. In a case of a remote computer, the remote computer may be connected to the user computer via any kind of network including a local area network (LAN) or wide area network (WAN), or may be connected to an external computer (for example, via the Internet provided by an Internet service provider).

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, program segment, or portion of code. The module, segment, or portion of code includes one or more executable instructions for implementing specified logical functions. It should also be noted that, in some alternative implementations, the functions noted in the blocks may be performed in an order different from the order noted in the drawings. For example, two blocks shown in succession may, in fact, be performed substantially concurrently, or the blocks may sometimes be performed in a reverse order, depending on functionality involved. It is also noted that each block of the block diagrams and/or flowchart illustrations, and a combination of blocks in the block diagrams and/or flowchart illustrations, may be implemented by a dedicated hardware-based system that performs the specified functions or operations, or by a combination of dedicated hardware and computer instructions.

The units described in some embodiments of the present disclosure may be implemented in software or hardware. The name of a unit does not, in any case, qualify the unit itself. For example, the first receiving unit may also be described as "a unit for receiving a multimedia data stream sent by a user participating in a multimedia conference".

The functions described herein above may be performed, at least in part, by one or more hardware logic components. For example, without limitation, illustrative types of hardware logic components that may be used include: a field programmable gate array (FPGA), an application specific integrated circuit (ASIC), an application specific standard product (ASSP), a system on chip (SOC), a complex programmable logical device (CPLD) and the like.

In the context of the present disclosure, a machine-readable medium may be a tangible medium that may contain or store a program used by or in connection with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer disk, a hard disk, a random-access memory (RAM), a read only memory (ROM), an erasable programmable read only memory (EPROM or flash memory), an optical fiber, a compact disk read only memory (CD-ROM), an optical storage device, a magnetic storage device, or any suitable combination of the foregoing.

Merely some preferred embodiments of the present disclosure and illustrations of the applied technical principles are described above. Those skilled in the art should understand that the scope of the invention involved in the embodiments of the present disclosure is not limited to the technical solutions formed by the specific combination of the above technical features, but should cover other technical solutions formed by any combination of the above technical features or their equivalents without departing from the above inventive concept, for example, a technical solution formed by replacing the features with technical features disclosed in the embodiments of the present disclosure (but not limited to) with similar functions. In the case of no contradiction, the various embodiments may be combined with each other to form a new technical solution.

The invention claimed is:

1. An interaction method, comprising:
    sending a multimedia conference starting request to a server in response to detection of a triggering operation on a multimedia conference control, wherein the server starts a multimedia conference in response to determination of the multimedia conference being started; and
    sending conference live confirmation information to the server in response to detection of a confirmation operation on a conference live confirmation control, wherein the server, in response to receipt of the conference live confirmation information and receipt of a multimedia conference stream, generates a live stream based on the received multimedia conference stream, and the multimedia conference stream is sent to the server by a client of the multimedia conference;
    wherein the server comprises a conference server and a live server; and
    the conference server generates the live stream based on the multimedia conference stream in response to receipt of the conference live confirmation information and receipt of the multimedia conference stream; and sends the generated live stream to the live server; or
    the conference server sends the multimedia conference stream to the live server in response to receipt of the conference live confirmation information and receipt of the multimedia conference stream, and the live server generates the live stream based on the multimedia conference stream; and
    the method further comprising at least one of the following:
    displaying the conference live confirmation control in response to receipt of live request information sent by another participant;
    displaying the conference live confirmation control in response to determination that a preset first conference condition is satisfied; or
    displaying the conference live confirmation control in response to receipt of live inquiry information sent by the server, wherein the live inquiry information is generated by the server in response to determination that a preset second conference condition is satisfied.

2. The method according to claim 1, further comprising:
    generating, by the server, live access information in response to receipt of the conference live confirmation information, and sending, by the server, the live access information to at least one of: the participant, a target audience, and a target network resource output terminal, wherein live access information indicates a manner in which the live stream is acquired.

3. The method according to claim 2, further comprising:
    sending, in response to detection of a predefined sharing confirmation operation, a sharing request comprising an identification of a sharing confirmation object to the server, wherein the server, in response to receipt of the sharing request, sends the live access information to the sharing object, and an identification of the sharing object indicates a sharing object targeted by the sharing confirmation operation.

4. The method according to claim 3, wherein a live stream request object, in response to receipt of the live access information, sends a live stream acquisition request to the server based on the live access information in response to detection of a trigger operation for the live access information, so that the server determines based on the live stream acquisition request whether to send the live stream to the live stream request object, and plays the live stream in response to receipt of the live stream.

5. The method according to claim 4, further comprising:
    sending, by the server, live situation information to the participant, wherein the live situation information indicates relevant situation of live broadcast started based on the multimedia conference, and the method further comprises: displaying the live situation information on the multimedia conference interface.

6. The method according to claim 4, wherein a live stream playing interface comprises an information input control for receiving feedback information, wherein the server, in response to receipt of the feedback information sent by the sharing object, sends the feedback information to the participant, wherein the method further comprises: displaying the feedback information on the multimedia conference interface.

7. The method according to claim 2, wherein the target network resource output terminal comprises at least one of: a target webpage, and a preset interface of a target application.

8. The method according to claim 2, wherein the target audience comprises a preconfigured user set.

9. The method according to claim 2, wherein the method further comprises:
    transmitting the live access information in a calendar event indicating the multimedia conference in response to receipt of the live access information and in response to determination that the multimedia conference is not started; and displaying the live access information in a display interface of the calendar event; and/or
    displaying the live access information on a multimedia conference interface in response to receipt of the live access information and in response to determination that the multimedia conference is in progress.

10. The method according to claim 3, wherein before the sending, in response to detection of a predefined sharing confirmation operation, a sharing request comprising an identification of a sharing object to the server, the method further comprises:
    displaying an identification of a candidate sharing object in response to detection of a predefined sharing starting operation, wherein the identification of the candidate sharing object is determined based on a preset shareable user range and/or a user associated with the participant; and
    determining, in response to detection of a predefined selection operation, an identification of a candidate sharing object targeted by the selection operation as the identification of the sharing object.

11. The method according to claim 10, wherein the shareable user range is determined based on at least one of: a pre-established organizational structure and a pre-established relationship between users.

12. The method according to claim 3, wherein the sharing object generates and displays forwarding restriction information in response to detection of a forwarding operation for the live access information, wherein the forwarding restriction information indicates that there is no permission to share the live access information.

13. The method according to claim 3, wherein a presentation style of the live access information is set depending on permission of the sharing object.

14. The method according to claim 13, wherein the permission of the sharing object comprises restricting to forward, wherein the sharing object encapsulates indication information of the live stream into a card for display, and the card is provided with a live stream request control rather than a forwarding control.

15. The method according to claim 3, wherein the live access information comprises at least one of:
a live address for indicating a live interface for playing the live stream; and
a conference identification indicating the multimedia conference.

16. The method according to claim 8, wherein the live stream acquisition request comprises a user identification; and determining, by the server based on the user identification in the live stream acquisition request, whether to return the live stream.

17. The method according to claim 16, wherein the determining, by the server based on the user identification in the live stream acquisition request, whether to return the live stream comprises: determining, by the server in response to receipt of the live stream acquisition request comprising the user identification, whether to return the live stream based on a pre-generated whitelist.

18. The method according to claim 17, further comprising:
sending sharing object range information to the server, wherein the server determines a sharing object range based on the received sharing object range information, and generates the whitelist based on a user identification in the sharing object range.

19. The method according to claim 18, wherein the sharing object range information comprises at least one of: a group identification and an organization identification.

20. The method according to claim 17, wherein the whitelist comprises the identification of the sharing object in the sharing request received by the server.

21. The method according to claim 1, wherein generating, by the server, a live stream based on the received multimedia conference stream, comprising:
acquiring the multimedia conference stream sent by the participant;
determining a participant currently speaking; and
generating the live stream based on the received multimedia conference stream and relevant information of the participant currently speaking.

22. The method according to claim 1, wherein the multimedia conference comprises an audio-video conference, and the live stream comprises at least one of: conference screen shared information, multimedia information of the participant, and related information of a participant currently speaking.

23. The method according to claim 1, further comprising: display the conference live confirmation control in response to detection of a triggering operation on a preset live request control.

24. The method according to claim 1, wherein the first conference condition comprises at least one of: the number of the participant of the multimedia conference is greater than a preset first threshold; a freezing rate of the multimedia conference is greater than a preset first freezing rate threshold; and a delay rate of the multimedia conference is greater than a preset first delay rate threshold;
wherein the second conference condition comprises at least one of: the number of the participant of the multimedia conference is greater than a preset second threshold; a freezing rate of the multimedia conference is greater than a preset second freezing rate threshold; and a delay rate of the multimedia conference is greater than a preset second delay rate threshold.

25. The method according to claim 1, wherein timing at which the conference live confirmation control is displayed comprises at least one of: before starting the multimedia conference or during the multimedia conference.

\* \* \* \* \*